(12) United States Patent
Khandekar et al.

(10) Patent No.: US 9,215,669 B2
(45) Date of Patent: Dec. 15, 2015

(54) PREAMBLE DESIGN FOR A WIRELESS SIGNAL

(75) Inventors: Aamod Khandekar, San Diego, CA (US); Alexei Gorokhov, San Diego, CA (US); Naga Bhushan, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 12/260,826

(22) Filed: Oct. 29, 2008

(65) Prior Publication Data

US 2009/0135761 A1    May 28, 2009

Related U.S. Application Data

(60) Provisional application No. 60/988,720, filed on Nov. 16, 2007.

(51) Int. Cl.
*H04W 52/24* (2009.01)
*H04W 72/00* (2009.01)
(Continued)

(52) U.S. Cl.
CPC .......... *H04W 52/244* (2013.01); *H04B 17/318* (2015.01); *H04L 5/0053* (2013.01);
(Continued)

(58) Field of Classification Search
CPC ............ H04L 72/0446; H04L 72/0473; H04L 5/0053; H04L 5/0032; H04L 5/0023; H04J 11/0056; H04W 16/00; H04W 16/02; H04W 16/10; H04W 16/14; H04W 16/16
USPC .................. 370/321, 329, 330, 335, 343, 331; 455/450; 715/764
See application file for complete search history.

(56) References Cited

U.S. PATENT DOCUMENTS 5,313,461 A     5/1994   Ahl et al.
5,625,628 A *   4/1997   Heath ........................... 370/321
(Continued)

FOREIGN PATENT DOCUMENTS

CN     1322419 A     11/2001
CN     1436434 A     8/2003
(Continued)

OTHER PUBLICATIONS

Chen S. L., et al., "Capacity improvement in cellular systems with dynamic channel assignment and reuse partitioning" Personal, Indoor and Mobile Radio Communications, 2003. PIMRC 2003. 14th IEEE Proceedings on Sept. 7-10, 2003, IEEE, Piscataway, NJ, USA, vol . 2, Sep. 7, 2003, pp. 1441-1445, XP010679303.
(Continued)

*Primary Examiner* — Joseph Bednash
(74) *Attorney, Agent, or Firm* — Ashish L. Patel

(57) ABSTRACT

Providing for base station (BS) acquisition in semi-planned or unplanned wireless access networks is described herein. By way of example, a signal preamble can be dynamically allocated to wireless signal resources, such that the preamble is scheduled to different resource(s) across different cycles of the signal. Dynamic allocation can be pseudo-random, based on collision feedback, or determined by a suitable algorithm to mitigate collisions from a dominant interferer. In addition, dynamic scheduling can be particular to a type of BS to significantly reduce collisions from BSs of disparate types. In at least one aspect, a preamble resource can be sub-divided into multiple frequency sub-carrier tiles. Control channel information can be transmitted on each tile of a group of such tiles, further mitigating effects of a dominant interferer on a subset of the tile group.

66 Claims, 14 Drawing Sheets

(51) Int. Cl.
*H04B 17/318* (2015.01)
*H04L 5/00* (2006.01)
*H04W 72/12* (2009.01)
*H04W 92/20* (2009.01)
*H04L 1/18* (2006.01)

(52) U.S. Cl.
CPC ............ *H04W 72/00* (2013.01); *H04L 1/1854* (2013.01); *H04L 5/006* (2013.01); *H04L 5/0023* (2013.01); *H04L 5/0032* (2013.01); *H04L 5/0091* (2013.01); *H04W 72/12* (2013.01); *H04W 92/20* (2013.01)

(56) References Cited

U.S. PATENT DOCUMENTS

| | | | |
|---|---|---|---|
| 5,822,696 A | | 10/1998 | Bergkvist |
| 5,953,323 A | * | 9/1999 | Haartsen .................. 370/330 |
| 5,953,665 A | | 9/1999 | Mattila |
| 6,052,594 A | * | 4/2000 | Chuang et al. ............... 455/450 |
| 6,134,231 A | | 10/2000 | Wright |
| 6,285,886 B1 | | 9/2001 | Kamel et al. |
| 6,351,643 B1 | * | 2/2002 | Haartsen .................. 455/450 |
| 6,393,295 B1 | | 5/2002 | Butler et al. |
| 6,483,826 B1 | | 11/2002 | Åkerberg |
| 6,522,628 B1 | | 2/2003 | Patel et al. |
| 6,556,582 B1 | | 4/2003 | Redi |
| 6,577,608 B1 | | 6/2003 | Moon et al. |
| 6,633,762 B1 | | 10/2003 | Rauscher |
| 6,724,815 B1 | | 4/2004 | Jepsen et al. |
| 6,728,217 B1 | | 4/2004 | Amirijoo et al. |
| 6,760,328 B1 | | 7/2004 | Ofek |
| 6,882,847 B2 | | 4/2005 | Craig et al. |
| 6,901,060 B1 | * | 5/2005 | Lintulampi .................. 370/329 |
| 6,973,326 B2 | | 12/2005 | Noh |
| 7,042,856 B2 | | 5/2006 | Walton et al. |
| 7,072,313 B2 | | 7/2006 | Kronz |
| 7,145,890 B1 | * | 12/2006 | Seo et al. .................. 370/331 |
| 7,158,503 B1 | * | 1/2007 | Kalliojarvi et al. ........... 370/347 |
| 7,356,049 B1 | | 4/2008 | Rezvani |
| 7,383,057 B1 | | 6/2008 | Senarath et al. |
| 7,400,642 B2 | | 7/2008 | Koo et al. |
| 7,474,643 B2 | | 1/2009 | Malladi et al. |
| 7,499,438 B2 | | 3/2009 | Hinman et al. |
| 7,640,013 B2 | | 12/2009 | Okita et al. |
| 7,966,033 B2 | | 6/2011 | Borran et al. |
| 2001/0053140 A1 | | 12/2001 | Choi et al. |
| 2002/0001299 A1 | | 1/2002 | Petch et al. |
| 2002/0012332 A1 | | 1/2002 | Tiedemann et al. |
| 2002/0028675 A1 | | 3/2002 | Schmutz et al. |
| 2002/0034158 A1 | | 3/2002 | Wang et al. |
| 2002/0172208 A1 | | 11/2002 | Malkamaki |
| 2002/0181436 A1 | | 12/2002 | Mueckenheim et al. |
| 2002/0187804 A1 | | 12/2002 | Narasimha et al. |
| 2003/0123425 A1 | | 7/2003 | Walton et al. |
| 2003/0134655 A1 | | 7/2003 | Chen et al. |
| 2003/0227889 A1 | | 12/2003 | Wu et al. |
| 2004/0203828 A1 | | 10/2004 | Mirchandani et al. |
| 2004/0240402 A1 | | 12/2004 | Stephens |
| 2004/0266339 A1 | | 12/2004 | Larsson |
| 2005/0002410 A1 | | 1/2005 | Chao et al. |
| 2005/0003796 A1 | | 1/2005 | Kashiwase |
| 2005/0068902 A1 | | 3/2005 | Rath |
| 2005/0079865 A1 | | 4/2005 | Ahn et al. |
| 2005/0197071 A1 | | 9/2005 | Yoshida et al. |
| 2005/0201325 A1 | | 9/2005 | Kang et al. |
| 2005/0281316 A1 | | 12/2005 | Jang et al. |
| 2006/0019701 A1 | | 1/2006 | Ji |
| 2006/0084459 A1 | | 4/2006 | Phan et al. |
| 2006/0114877 A1 | | 6/2006 | Heo et al. |
| 2006/0133381 A1 | | 6/2006 | Wang |
| 2006/0172716 A1 | | 8/2006 | Yoshii et al. |
| 2006/0211441 A1 | | 9/2006 | Mese et al. |
| 2006/0215559 A1 | | 9/2006 | Mese et al. |
| 2006/0246936 A1 | | 11/2006 | Gross et al. |
| 2006/0251006 A1 | | 11/2006 | Oliver et al. |
| 2006/0285522 A1 | | 12/2006 | Kim et al. |
| 2006/0286996 A1 | | 12/2006 | Julian et al. |
| 2007/0041429 A1 | | 2/2007 | Khandekar |
| 2007/0060057 A1 | | 3/2007 | Matsuo et al. |
| 2007/0064666 A1 | * | 3/2007 | Kwun et al. .................. 370/343 |
| 2007/0082619 A1 | | 4/2007 | Zhang et al. |
| 2007/0097897 A1 | | 5/2007 | Teague et al. |
| 2007/0105574 A1 | | 5/2007 | Gupta et al. |
| 2007/0105576 A1 | | 5/2007 | Gupta et al. |
| 2007/0115817 A1 | | 5/2007 | Gupta et al. |
| 2007/0135125 A1 | | 6/2007 | Kim et al. |
| 2007/0140168 A1 | * | 6/2007 | Laroia et al. .................. 370/330 |
| 2007/0161389 A1 | | 7/2007 | Khandekar |
| 2007/0165575 A1 | | 7/2007 | Niwano |
| 2007/0168165 A1 | | 7/2007 | Das et al. |
| 2007/0173256 A1 | | 7/2007 | Laroia et al. |
| 2007/0217352 A1 | | 9/2007 | Kwon |
| 2007/0253355 A1 | | 11/2007 | Hande et al. |
| 2007/0280170 A1 | | 12/2007 | Kawasaki |
| 2008/0039089 A1 | * | 2/2008 | Berkman et al. ............. 455/436 |
| 2008/0039133 A1 | | 2/2008 | Ma et al. |
| 2008/0057934 A1 | | 3/2008 | Sung et al. |
| 2008/0062925 A1 | | 3/2008 | Mate et al. |
| 2008/0069028 A1 | * | 3/2008 | Richardson .................. 370/328 |
| 2008/0101301 A1 | * | 5/2008 | Thomas et al. ............... 370/335 |
| 2008/0102822 A1 | | 5/2008 | Feng et al. |
| 2008/0130586 A1 | | 6/2008 | Johnson et al. |
| 2008/0144577 A1 | | 6/2008 | Huang et al. |
| 2008/0167075 A1 | | 7/2008 | Kurtz et al. |
| 2008/0253355 A1 | * | 10/2008 | Tominaga et al. ............ 370/350 |
| 2009/0023477 A1 | | 1/2009 | Staudte |
| 2009/0061871 A1 | | 3/2009 | Gross et al. |
| 2009/0070694 A1 | * | 3/2009 | Ore et al. .................. 715/764 |
| 2009/0092178 A1 | | 4/2009 | Sayana et al. |
| 2009/0129333 A1 | | 5/2009 | Khandekar et al. |
| 2009/0129350 A1 | | 5/2009 | Khandekar et al. |
| 2009/0131098 A1 | | 5/2009 | Khandekar et al. |
| 2009/0197588 A1 | | 8/2009 | Khandekar et al. |
| 2009/0203385 A1 | | 8/2009 | Khandekar et al. |
| 2010/0260163 A1 | | 10/2010 | Machida |

FOREIGN PATENT DOCUMENTS

| | | |
|---|---|---|
| CN | 1518838 A | 8/2004 |
| CN | 1795645 A | 6/2006 |
| CN | 101043640 A | 9/2007 |
| EP | 1699199 A1 | 9/2006 |
| EP | 2217011 A1 | 8/2010 |
| FR | 2854009 A1 | 10/2004 |
| GB | 2353189 A | 2/2001 |
| JP | H08505033 A | 5/1996 |
| JP | 11252114 A | 9/1999 |
| JP | 2001028779 A | 1/2001 |
| JP | 2002111627 | 4/2002 |
| JP | 2002217819 A | 8/2002 |
| JP | 2002232353 A | 8/2002 |
| JP | 2004207983 A | 7/2004 |
| JP | 2005210703 A | 8/2005 |
| JP | 2005244906 A | 9/2005 |
| JP | 2007514445 A | 6/2007 |
| JP | 2007521694 A | 8/2007 |
| JP | 2007295356 A | 11/2007 |
| JP | 2008510437 A | 4/2008 |
| JP | 2008278264 A | 11/2008 |
| JP | 2009510970 A | 3/2009 |
| JP | 2010534099 A | 11/2010 |
| JP | 4941563 B2 | 5/2012 |
| KR | 100260457 B1 | 7/2000 |
| KR | 100765892 B1 | 10/2007 |
| RU | 2108673 | 4/1998 |
| RU | 2148891 C1 | 5/2000 |
| RU | 2183909 C2 | 6/2002 |
| RU | 2197779 C2 | 1/2003 |
| RU | 2004119813 A | 12/2005 |
| RU | 2276464 C2 | 5/2006 |
| WO | WO9416513 A1 | 7/1994 |
| WO | 9511559 A1 | 4/1995 |
| WO | 9833339 A2 | 7/1998 |

(56) References Cited

FOREIGN PATENT DOCUMENTS

| | | |
|---|---|---|
| WO | WO-9839940 | 9/1998 |
| WO | WO9908464 A1 | 2/1999 |
| WO | WO-0010336 A2 | 2/2000 |
| WO | 0049828 | 8/2000 |
| WO | 0070786 A1 | 11/2000 |
| WO | WO0165749 | 9/2001 |
| WO | WO0176098 A2 | 10/2001 |
| WO | WO-02091597 A2 | 11/2002 |
| WO | WO03028245 A1 | 4/2003 |
| WO | WO2004006467 | 1/2004 |
| WO | 2005006586 A2 | 1/2005 |
| WO | 2005036914 | 4/2005 |
| WO | WO2005043866 A1 | 5/2005 |
| WO | WO-2005059111 A2 | 6/2005 |
| WO | WO2005101888 | 10/2005 |
| WO | WO2005109705 | 11/2005 |
| WO | WO2006023536 A2 | 3/2006 |
| WO | 2006045097 A2 | 4/2006 |
| WO | 2006096421 | 9/2006 |
| WO | 2007022631 | 3/2007 |
| WO | WO2007024895 | 3/2007 |
| WO | WO-2007040450 A1 | 4/2007 |
| WO | WO-2007043096 A1 | 4/2007 |
| WO | WO2007044281 | 4/2007 |
| WO | 2007051182 | 5/2007 |
| WO | WO2007078177 | 7/2007 |
| WO | WO2007078199 A1 | 7/2007 |
| WO | WO2007092771 | 8/2007 |
| WO | WO-2007114966 | 10/2007 |
| WO | WO-2007114996 A1 | 10/2007 |
| WO | 2007123519 | 11/2007 |
| WO | WO2008113966 | 9/2008 |
| WO | WO-2009054058 A1 | 4/2009 |
| WO | WO-2009064648 A1 | 5/2009 |

OTHER PUBLICATIONS

Cruz-Perez, et al., "Frequency reuse and distributed dynamic channel assignment in microcellular systems" IEEE International Symposium on Personal, Indoor and Mobile Radio Communications, Sep. 1, 1997, pp. 415-419, XP010247680.
Dae N. B., et al., "Channel state-aware joint dynamic cell coordination scheme using adaptive modulation and variable reuse factor in OFDMA downlink" Telecommunication Systems, vol. 36, No. 1-3, Dec. 4, 2007, pp. 85-96, XP019581250.
Elayoub, et al., "Performance evaluation of frequency planning schemes in OFDMA-based networks" IEEE Transactions on Wireless Communications, vol. 7, No. 5, May 2008, pp. 1623-1633, XP011215006.
Halpern, "Reuse partitioning in cellular systems" IEEE Vehicular Technology Conference, Jan. 1983, pp. 322-327, XP002096008.
International Search Report and Written Opinion—PCT/US2008/083049, International Search Authority—European Patent Office—Feb. 9, 2009.
Jia, et al., "On the Performance of IEEE 802.16 OFDMA System Under Different Frequency Reuse and Subcarrier Permutation Patterns" IEEE International Conference on Communications, Jun. 2007, pp. 5720-5725, XP031126581.
Johansson, "Dynamic Reuse Partitioning Within Cells Based on Local Channel and Arrival Rate Fluctuations" IEEE Transactions on Vehicular Technology, vol. 57, No. 2, Mar. 2008, pp. 1155-1165, XP011201845.
Kataoka, et al., "Channel information assisted reuse partitioning—a distributed dynamic channel assignment algorithm based on reuse partitioning" International Conference on Universal Personal Communications, Sep. 27, 1994, pp. 536-540, XP010131611.
Kiani, et al., "Maximizing Multicell Capacity Using Distributed Power Allocation and Scheduling" IEEE Wireless Communications and Networking Conference, Mar. 11, 2007, pp. 1692-1696, XP031097456.
Klerer: "802.20 harmonized draft editing group version" IEEE P802.20-D3.0, Apr. 3, 2007, pp. 1-1 149, XP040393818 Piscataway, US.
Michael Wang, et al., "Preamble Design in Ultra Mobile Broadband Communication Systems" IEEE International Workshop on Signal Design and Its Applications in Communications, Sep. 23, 2007, pp. 328-333, XP031194263.
Mitsubishi Electric, "Combined fixed and adaptive soft-frequency reuse for inter-cell interference coordination" 3GPP Draft R1-083615, Sep. 28, 2008, XP050316974 Sophia-Antipolis, FR [retrieved on Sep. 23, 2008] . pp. 1-4.
Neung-Hyung Lee, et al., "Channel allocation considering the interference range in multi-cell OFDMA downlink systems" Communication Systems Software and Middleware, 2007. Comsware 2007. 2nd International Conference On, IEEE, PI, Jan. 2007, pp. 1-6, XP031113903.
Onoe, et al., "Flexible re-use for dynamic channel assignment in mobile radio systems" International Conference on Communications, Jun. 11, 1989, pp. 472-476, XP010081098.
QUALCOMM Europe: "Description and simulations of interference management" 3GPP Draft R1-050896, Aug. 24, 2005, XP050100516 Sophia-Antipolis, FR. pp. 1-10.
Rahman, et al., "Interference Avoidance through Dynamic Downlink OFDMA Subchannel Allocation using Intercell Coordination" IEEE Vehicular Technology Conference, May 11, 2008, pp. 1630-1635, XP031255841.
Seok H. W., et al., "Inter-Cell Interference Coordination/Avoidance for Frequency Reuse by Resource Scheduling in an OFDM-Based Cellular System" IEEE Vehicular Technology Conference, Sep. 1, 2007, pp. 1722-1725, XP031147702.
Steven L. C., et al., "Dynamic Channel Assignment with Flexible Reuse Partitioning in Cellular Systems" Wireless Personal Communications, vol. 42, No. 2, Aug. 16, 2006, pp. 161-183, XP019509800.
Stolyar, et al., "Self-Organizing Dynamic Fractional Frequency Reuse in OFDMA Systems" IEEE Conference on Computer Communications, Apr. 13, 2008, pp. 691-699, XP031263869.
Wang, et al., "Interference Management and Handoff Techniques in Ultra Mobile Broadband Communication Systems" IEEE International Symposium Onspread Spectrum Techniques and Applications, Aug. 25, 2008, pp. 166-172, XP031319003.
Young-June Coi., et al., "Flexible Design of Frequency Reuse Factor in OFDMA Cellular Networks" IEEE International Conference on Communications, Jun. 2006, pp. 1784-1788, XP031025320.
Kaist: "Spread Spectrum Systems", Fall semester 2000, pp. 1-37.
Marc C. et al., "Coordinated Fractional Frequency Reuse", MSWiM'07, Oct. 22-26, 2007, pp. 296-305.
European Search Report—EP10190712—Search Authority—The Hague—Sep. 19, 2012.
Taiwan Search Report—TW097144285—TIPO—Mar. 9, 2012.
Taiwan Search Report—TW097144285—TIPO—Oct. 20, 2013.
Jette, et al., "UMBFDD Draft Technology Overview, IEEE C802.20-07/09", IEEE 802.20 Working Group on Mobile Broadband Wireless Access, Mar. 5, 2007, pp. 1-34.
Taiwan Search Report—TW101145343—TIPO—Nov. 20, 2014.
QUALCOMM Europe, "Restricted Association for HNBs," 3GPP Draft, TSG-RAN WG2 #59bis, Jeju, China, R2-075125, Nov. 12, 2007, pp. 1-6.
Wang M, "Preamble Design in Ultra Mobile Broadband Communication Systems, Signal Design and Its Applications in Communications," 2007. IWSDA 2007. 3rd International Workshop on, Sep. 23, 2007, URL: http://ieeexplore.ieee.org/stamp/stamp.jsp?tp=&arnumber=4408390UMBFDD Draft Technology Overview, IEEE C802.20-07/09, Mar. 11, 2007, pp. 4-11, URL : http://grouper.ieee.org/groups/802/20/Contribs/C802.20-07-09.pdf.

* cited by examiner

PREAMBLE DESIGN FOR A WIRELESS SIGNAL

CLAIM OF PRIORITY UNDER 35 U.S.C. §119

The present application for patent claims priority to U.S. Provisional Application No. 60/988,720 entitled FEMTO PREAMBLE DESIGN filed Nov. 16, 2007, assigned to the assignee hereof and hereby expressly incorporated by reference herein.

REFERENCE TO CO-PENDING APPLICATIONS FOR PATENT

The present application for patent is related to the following co-pending U.S. patent applications:

"SECTOR INTERFERENCE MANAGEMENT BASED ON INTER-SECTOR PERFORMANCE" by Aamod Khandekar et al., having Attorney Docket No. 080823, filed concurrently herewith, assigned to the assignee hereof, and expressly incorporated by reference herein;

"PREAMBLE DESIGN FOR A WIRELESS SIGNAL" by Aamod Khandekar et al., having Attorney Docket No. 080278U1, filed concurrently herewith, assigned to the assignee hereof, and expressly incorporated by reference herein; and "PREAMBLE DESIGN FOR A WIRELESS SIGNAL" by Aamod Khandekar et al., having Attorney Docket No. 080278U2, filed concurrently herewith, assigned to the assignee hereof, and expressly incorporated by reference herein; and "PREAMBLE DESIGN FOR A WIRELESS SIGNAL" by Aamod Khandekar et al., having Attorney Docket No. 080278U3, filed concurrently herewith, assigned to the assignee hereof, and expressly incorporated by reference herein; and "BACKHAUL SIGNALING FOR INTERFERENCE AVOIDANCE" by Aamod Khandekar et al., having Attorney Docket No. 080694, filed concurrently herewith, assigned to the assignee hereof, and expressly incorporated by reference herein.

BACKGROUND

I. Field

The following relates generally to wireless communication, and more specifically to preamble design of a wireless signal facilitating reduced interference for semi-planned or unplanned wireless access networks.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

Wireless messages are typically sub-divided in time, frequency, according to codes, and so on, to convey information. For instance, in an ultra mobile broadband (UMB) system, forward link messages comprise at least one time superframe (e.g., of 25 millisecond length) segmented into one superframe preamble and several time frames. The preamble carries acquisition and control information, while the various other time frames carry traffic, such as voice information pertinent to a voice call, data packets pertinent to a data call or data session, or the like. Acquisition information can be utilized by mobile terminals within a given mobile network sector to identify transmitting base stations within the sector. Control channel information provides commands and other instructions for decoding received signals.

In UMB, a superframe preamble comprises eight orthogonal frequency division multiplex (OFDM) symbols. The first symbol typically carries a forward primary broadcast control channel (F-PBCCH) and the next four symbols can carry a forward secondary broadcast control channel (F-SBCCH) and forward quick paging channel (P-QPCH). The F-PBCCH and F-SBCCH typically provide initial configuration information required by terminals entering a UMB system. For instance, the F-PBCCH channel might carry deployment-wide configuration information that is common across sectors, while the F-SBCCH might carry sector-specific configuration information. The F-QPCH can carry quick pages which are used to direct idle mode terminals to read a page and open a connection if a page is received.

The last three OFDM symbols of the UMB preamble can carry acquisition pilot information. The first of these three symbols typically carries a sector-independent signal used to determine the existence of a UMB system and to acquire initial timing and frequency. A second, sector-dependent signal can be utilized to determine identity of a transmitting sector and/or base station. A third signal, also sector-dependent, can carry information used to determine initial system parameters such as whether the system is synchronous or asynchronous, what time division duplex (TDD) partition to use, and so on. In another example, for instance with a third generation partnership project long term evolution (3GPP-LTE) network, acquisition pilot information can comprise different signals than those specified above for the UMB example. For instance, the 3GPP-LTE system typically employs a primary synchronization code (PSC), secondary synchronization code (SSC), and a packet broadcast channel (PBCH) as acquisition pilot signals. Although the synchronization signals can comprise different forms (e.g., sequence lengths, scrambling sequences, modulation and timing, etc.), similar information can be conveyed by these signals. Thus, for instance, LTE codes can convey identity of a transmitting sector/base station, timing and modulation information for decoding received signals, default system parameters, and the like. The LTE codes can be conveyed utilizing a portion of the OFDM symbols of an LTE preamble (e.g. localized in time and in frequency) as is known in the art.

While the foregoing describes a preamble for UMB and LTE systems, various other mobile communication systems also utilize channel preambles, or similar structures, for signaling, acquisition, control or like wireless communication functions. Other functions can include specifying formats of traffic channels for some wireless systems. Typically, a preamble is set apart from a traffic-related portion of a wireless signal to facilitate distinction of application-related information and control information at a receiver. Thus, the receiver can monitor control portions to identify whether a signal contains traffic pertinent to a receiving device, without having to monitor the traffic portions themselves. Because the control portion is typically only a small fraction of the total signal, receiver devices can significantly reduce processing requirements and power consumption by monitoring a signal preamble to determine whether relevant information is contained in the signal. Employing control channels for wireless signaling therefore leads to more effective communication, as well as improved mobility by extending battery life for mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for enabling access point (AP) (e.g., a base station [BS]) detection for semi-planned or unplanned AP deployments in a wireless access network (AN). According to particular aspects of the subject disclosure, AP detection for a heterogeneous wireless AN is provided. AP detection can be facilitated by employing preamble re-use scheduling as described herein. In one or more aspects, the preamble re-use scheduling can be dynamic such that a wireless AP schedules and transmits a preamble in different signal resources over time (e.g. different time superframes). According to other aspects, a segment(s) of a wireless signal can be allocated to preambles of APs of disparate type. In one instance, the disparate type can be a disparate access type. Thus, as a particular example, a signal resource (e.g., time slot, frequency band/sub-band, code or group of codes, etc.) can be designated for preambles of general access (GA) base stations (BSs), and another signal resource can be designated for preambles of restricted access (RA) base stations (BSs). Accordingly, preamble interference (e.g., collisions) between GA and RA BSs can be significantly reduced.

According to other aspects of the subject disclosure, one or more portions of a wireless signal are designated for preamble transmission by low or mid power transmitters; high power transmitters (e.g., a macro cell base station) blank these designated portions of the wireless signal. Accordingly, interference between larger, high power BSs and mid to low power BSs can be mitigated in at least these designated portions of the wireless signal. It should be appreciated that the subject disclosure can provide AP detection (e.g., based on preamble collision mitigation) for legacy mobile networks, and also for un-planned or semi-planned wireless ANs, having (BSs) of different size and/or transmit power.

According to one or more additional aspects, provided is a method of BS detection in a wireless AN. The method can comprise establishing a set of signal resources for a wireless signal. The method can further comprise employing resource re-use in scheduling an acquisition pilot to the wireless signal.

In one or more other aspects, disclosed is a wireless BS that facilitates detection of the BS in a wireless AN. The wireless BS can comprise a wireless transceiver that transmits a wireless signal. Further, the wireless BS can comprise a signal parser that establishes a set of signal resources for a wireless signal and employs resource re-use in scheduling an acquisition pilot to the wireless signal.

In still other aspects, provided is an apparatus configured to provide BS detection in a wireless AN. The apparatus can comprise means for establishing a set of signal resources for a wireless signal. The apparatus can further comprise means for employing resource re-use in scheduling an acquisition pilot to the wireless signal.

According to one or more additional aspects, disclosed is a processor configured to provide BS detection in a wireless AN. The processor can comprise a first module that establishes a set of signal resources for a wireless signal. The processor can further comprise a second module that employs resource re-use in scheduling an acquisition pilot to the wireless signal.

In at least one further aspects, provided is a computer-readable medium comprising computer-readable instructions executable by at least one computer to establish a set of signal resources for a wireless signal. Additionally, the instructions can be executable by the at least one computer to employ resource re-use in scheduling an acquisition pilot to the wireless signal.

Further to the above, provided is a method of enabling BS detection in a wireless AN. The method can comprise establishing a set of signal resources for a wireless signal. Furthermore, the method can comprise employing random, pseudo-random, or learned re-use in scheduling control channel information to the wireless signal.

Additionally, the subject disclosure provides for a wireless BS that enables BS detection in a wireless AN. The wireless BS can comprise a wireless transceiver that transmits a wireless signal. Moreover, the wireless BS can comprise a signal parser that establishes a set of signal resources for the wireless signal and employs random, pseudo-random or learned resource re-use in scheduling control channel information to the wireless signal.

In further aspects, disclosed is an apparatus for enabling BS detection in a wireless AN. The apparatus can comprise means for establishing a set of signal resources for a wireless signal. Additionally, the apparatus can comprise means for employing random, pseudo-random or learned re-use in scheduling control channel information to the wireless signal.

In one or more other aspects, provided is a processor configured to enable BS detection in a wireless AN. The processor can comprise a first module that establishes a set of signal resources for a wireless signal. Further, the processor can comprise a second module that employs random, pseudo-random or learned re-use in scheduling control channel information to the wireless signal.

According to still other aspects, disclosed is a computer-readable medium. The computer-readable medium can comprise computer-readable instructions executable by at least one computer to establish a set of signal resources for a wireless signal. The computer-readable instructions can be further executable by the at least one computer to employ random, pseudo-random or learned re-use in scheduling control channel information to the wireless signal.

In addition to the foregoing, disclosed is a method of detecting a wireless BS. The method can comprise obtaining a wireless signal comprising at least a first and second time cycle. The method can also comprise at least one of the following: obtaining an acquisition pilot from one time frame of the first time cycle and from a different time frame of the second time cycle; or employing a random, pseudo-random or learned re-use function to obtain control channel information from the wireless signal.

According to other aspects, provided is an apparatus configured for detection of a wireless BS. The apparatus can comprise a wireless antenna that obtains a wireless signal comprising at least a first and second time cycle. Moreover, the apparatus can comprise a receive processor that at least one of: obtains an acquisition pilot from one time frame of the first time cycle and from a different time frame of the second time cycle; or employs a random, pseudo-random or learned re-use function to obtain control channel information from the wireless signal. Additionally, the apparatus can comprise memory coupled to the receive processor.

In accordance with yet other aspects, disclosed is an apparatus configured for detecting a wireless BS. The apparatus can comprise means for obtaining a wireless signal comprising at least a first and second time cycle. The apparatus can further comprise at least one of: means for obtaining an acquisition pilot from one time frame of the first time cycle and from a different time frame of the second time cycle; or means for employing a random, pseudo-random or learned re-use function to obtain control channel information from the wireless signal.

According to one or more particular aspects, provided is a processor configured for detection of a wireless BS. The processor can comprise a first module that obtains a wireless signal comprising at least a first and second time cycle. Moreover, the processor can comprise a second module that at least one of: obtains an acquisition pilot from one time frame of the first time cycle and from a different time frame of the second time cycle; or employs a random, pseudo-random or learned re-use function to obtain control channel information from the wireless signal.

In at least one other aspect, disclosed is a computer-readable medium. The computer-readable medium comprises computer-readable instructions executable by at least one computer to obtain a wireless signal comprising at least a first and second time cycle. Furthermore, the instructions can be executable by the at least one computer to at least one of: obtain an acquisition pilot from one time frame of the first time cycle and from a different time frame of the second time cycle; or employ a random, pseudo-random or learned re-use function to obtain control channel information from the wireless signal.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
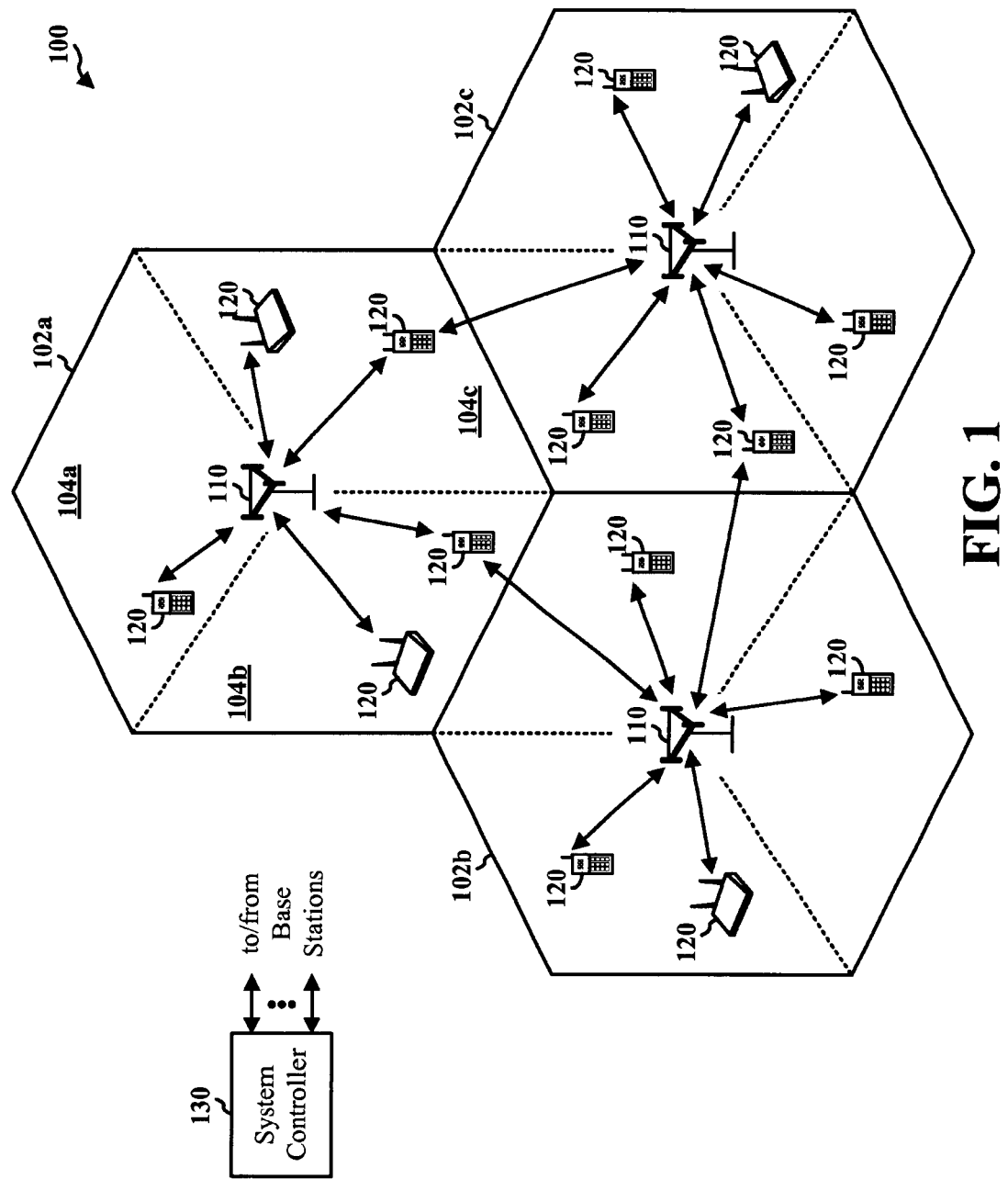
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of scheduling wireless signal preamble information in a manner that reduces preamble collisions among nearby BSs. One skilled in the art should appreciate that similar techniques could apply to other communication environments.

Planned deployments of wireless base stations (BSs) in a wireless access network (AN) typically consider position, spacing and transmission/receive characteristics of transceiver devices. One goal of planned deployment is to reduce interference among transmitters. Thus, for instance, two base stations might be spaced apart a distance similar to a maximum transmit range of their respective transmitters. Accordingly, interference from one base station at the other can be minimized.

In unplanned or semi-planned BS deployments, wireless transmitters are often not spaced considering their transmit power, transmit direction, or like characteristics that can be managed to reduce interference. Instead, is might not be unusual for two or more similarly transmitting BSs (e.g., that transmit into substantially 360 degrees) to be in close proximity of each other. Furthermore, in heterogeneous transmit power environments, a high power BS (e.g. macro cell at 20 watts) may be situated proximate a mid or low power transmitter (e.g., micro cell, pico cell, femto cell, etc., of varying transmission power, e.g., 8 watts, 3 watts, 1 watt, and so on). The higher power transmitter can be a significant source of interference for the mid and/or low power transmitters. Furthermore, depending on proximity of a receiver to the mid/low power transmitter(s), significant interference of the high power transmitter can result as well. Accordingly, signal interference in semi or un-planned environments and/or heterogeneous transmit power environments can often be a significant problem as compared with the conventional planned macro base station AN.

In addition to the foregoing, restricted access (RA) BSs can compound problems resulting from semi and un-planned BS deployment. For instance, an RA BS can selectively provide access to one or more terminal devices, denying network access to other such devices. Accordingly, devices denied access are forced to search for other BSs, which often observe significant interference from the denying BS. As utilized herein, an RA BS can also be termed a private BS (e.g., a Femto cell BS or a home Node B [HNB]), or some similar terminology.

Although RA BSs add network complexity, they do provide significant utility. For instance, a personal RA BS can be installed privately in a home, at an office, etc., utilizing private networking resources for voice and or data access (e.g., to the Internet and/or to a mobile operator's network). Such an arrangement can provide great individual control over a subscriber's network access via the personal RA BS. However, because the network interface utilizes a subscriber's private network resources, rather than resources maintained by a network operator, the owner of such a BS might not want those resources utilized by general access mobile users; accordingly, an RA BS can typically limit access to pre-specified terminal devices, preserving resources for authorized users.

Further to the above, un-planned, heterogeneous and RA deployments can lead to poor geometrical conditions for a wireless AN. Even without restricted association, a device that observes a very strong signal from a macro BS could prefer to connect to a pico BS, because the pico BS is "closer" to the terminal in terms of path-loss. Thus, the pico BS is capable of serving the terminal at a comparable data rate while causing less interference to the wireless AN. However, a terminal monitoring the pico BSs signal (e.g. a preamble comprising control and acquisition information) will observe significant interference from the macro BS, resulting in a low signal to noise ratio (SNR) at the terminal (e.g., possibly rendering the pico BS undetectable by the BS).

Additional problems can also result when an RA BS is introduced into the heterogeneous BS environment, discussed above. In such a case, a terminal device can be very close to a BS to which it is not allowed to connect, observing signals of such BS at very high level. Accordingly, this BS will cause strong interference (and, e.g. resulting in very low SNR) for a BS serving the terminal (e.g., the closest BS the terminal is allowed to connect to). In some case, the interference can be so strong as to desensitize an analog/digital (A/D) converter of the terminal. To illustrate the problem of desensitization, components of the terminal can typically be set based on a total received signal strength plus an interference level (which, e.g., can be dominated by the RA BS in the above scenario). Where the signal level of the serving BS is extremely low relative the nearby RA BS, such signal can be below a quantization noise level. In such is the case, even if the interfering BS is present on different frequency resources of a wireless signal than the serving BS (e.g. a different sub-carrier or set of sub-carriers), the interfering BS can still render the serving BS undetectable at the terminal, the latter being masked by quantization noise.

As described herein, several aspects of the subject disclosure are provided to address the foregoing problems or similar network communication and/or access problems. In one such aspect of the subject disclosure, dynamic preamble re-use can be employed for scheduling a preamble of a BS. The dynamic preamble re-use can provide a good probability that BSs interfering in one time cycle or superframe of a wireless signal do not interfere in another such time cycle/superframe. Accordingly, terminal devices observing significant interference can monitor the wireless signal until decodable preamble data is obtained. As utilized herein, dynamic preamble re-use refers to scheduling signal preambles in different resources of two or more superframes or cycles of a wireless signal. Thus, as one example, dynamic preamble re-use can employ a first resource of a first superframe/cycle, etc., of the wireless signal to transmit the preamble, and employ a second resource (different from the first resource) to transmit the preamble in a subsequent superframe/cycle of the wireless signal. Furthermore, dynamic preamble re-use can comprise full resource re-use or fractional re-source re-use. As utilized herein, fractional resource re-use refers to employing only a portion of time, frequency, code and/or symbol-based resources of a particular time cycle of a wireless signal. Thus, for instance, fractional re-use can involve transmitting data on three or fewer of four frequency sub-bands associated with one time frame of the particular time cycle. Full re-use (or, e.g. non re-use), on the other hand, refers to employing all resources of at least one time frame of the particular time cycle (optionally excluding buffer frequencies utilized to reduce interference in neighboring frequency channels). Thus, in the foregoing example, full re-use employs all four of the frequency sub-bands to transmit the data.

In one or more other aspects of the disclosure, preamble re-use can vary from BS to BS. For instance, different resources of a wireless signal can be utilized by BSs of disparate access types, of disparate transmit powers, of disparate re-use types (e.g., re-use or non re-use), or simply having disparate BS IDs. Thus, in one particular example, a first portion of a wireless signal can be reserved for preambles of GA BSs and a second portion of the wireless signal can be reserved for preambles of RA BSs. An RA BS can be restricted from transmitting in the first portion of the wireless signal. According to some aspects, low or mid power GA BSs can be permitted to transmit in the second portion of the wireless signal, although high power (e.g., macro cell) GA BSs are restricted from transmitting in such second portion.

According to such aspects, then, a low to mid power BS can transmit a preamble in either the first portion of the wireless signal or the second portion, but high power BSs and RA BSs are restricted from at least one portion of the wireless signal, and must blank such portion.

By requiring macro BSs to blank a portion of a wireless signal dedicated to RA BSs (or, e.g., RA and low to mid power GA BSs), a terminal device can ignore this portion of the wireless signal when not served by the macro BS. Furthermore, by requiring a RA BS to blank a portion of the wireless signal dedicated to GA BSs, the terminal can ignore such portion of the wireless signal when served by the macro BS. Accordingly, preamble interference can be significantly reduced by requiring macro and RA BSs to transmit preambles in separate respective portions of the wireless signal, and/or leave another designated portion(s) blank. According to some aspects, the portions of the signal can be time-segments, frequency-segments, or time and frequency segments. In at least one aspect, the portions are separate time frames or sub-frames of the wireless signal, to mitigate desensitization at a receiver due to high disparity in received signal strength and very low SNR, as discussed above.

Employing dynamic re-use in scheduling acquisition pilot and/or control channel information can enable a mobile terminal to decode a signal on one time cycle that is significantly interfered with by another pilot on another time cycle(s) of the signal. As an example, an acquisition pilot of a first base station could be significantly weaker than a second acquisition pilot of a second base station, as measured at a receiving device. Such disparity in signal strength can result if the first base station is much further from the receiver than the second base station, if the first base station transmits at a much weaker power than the second base station, if the signal from the first base station is affected by significant environmental scattering or interference, or a combination of the foregoing. Although signal strength disparity can result in failure to decode a signal in one resource, by employing dynamic re-use, a base station can increase a likelihood that a transmitted pilot will not collide with another base station's pilot on one or more resources. Accordingly, by monitoring a signal over time, a receiver has a high probability of observing a resource in which the weaker acquisition pilot does not see the stronger pilot as a significant interferer. Thus, by observing resources of the signal over time, the receiver can increase probability of decoding a pilot of a significantly weaker base station.

In some cases, the weaker base station can be a preferred base station. For instance, the weaker base station can provide lower signal path loss, as discussed above. In other cases, the weaker base station can be an RA base station associated with the receiver, which provides preferred billing or other benefits. In such case, a receiver detecting a signal from such weaker BS can initiate handoff procedures to such BS. Handoff can comprise accessing the BS and implementing a receiver-initiated handoff, or report the weaker/preferred BS to a serving BS to facilitate a network-implemented handoff.

In other cases, detection of the weaker BS can lead to interference avoidance operations with such weaker BS. In one aspect, interference avoidance can comprise reporting a signal characteristic of the weaker BSs pilot to such BS or to a receiver's serving BS. In other aspects, interference avoidance can comprise a receiver or serving BS submitting a request to another BS to reduce signal strength, reduce signal strength on a particular FL resource(s), blank a particular FL resource(s), or the like. Such a request can be termed a resource utilization message (RUM), (e.g., as described in co-pending and related application Sector Interference Management Based on Inter-Sector Performance, incorporated by reference herein) or an interference avoidance request (e.g., as described in co-pending and related application Backhaul Signaling for Interference Avoidance, incorporated by reference herein). Interference avoidance messages can be sent directly from a receiver to the weaker BS (e.g., utilizing a RL channel with the serving BS and a backhaul network coupling the serving BS and weaker BS) or indirectly via the serving BS (e.g., where detection of the acquisition pilot of the weaker BS, or a characteristic of such pilot, is submitted to the serving BS to manage interference avoidance from the network).

According to one or more additional aspects of the subject disclosure, a BS and/or wireless access point network can partition signal resources at least in part on a type of BS transmitting a signal. As an example, one or more portions of a signal can be reserved for preamble scheduling by a BS of a particular type. If a transmitting BS is not of the particular type, it can blank the reserved portion(s), transmitting no or substantially no data in such portions. Thus, for instance, RA, GA, low/mid power BSs, high power BSs, re-use BSs, non re-use BSs, and so forth, can have resources of the wireless signal dedicated for preamble transmission. Furthermore, the dedicated resources can by scheduled utilizing dynamic allocation, such that the preamble is scheduled to different signal resources in a first cycle/superframe as compared with a second cycle/superframe of the wireless signal. Furthermore, reserved portions can be dedicated to one or more superframes of the wireless signal. Thus, in one possible example, one time frame can be dedicated to RA and low/mid power preamble scheduling per every two time superframes of the wireless signal. In another possible example, two time frames can be dedicated to the RA and low/mid power preamble (or, e.g. GA preamble, re-use preamble, non re-use preamble, etc.) scheduling per one time superframe, and so on. Selection of number of dedication portions of the wireless signal versus number of superframes/cycles can be based on number of transmitters of a select type in a wireless AN, interference level for preambles of such transmitters, number of collisions determined in such portions of the wireless channel, or the like.

According to some aspects, time and or frequency re-use can be employed for preamble scheduling. Thus, signal resources can be sub-divided into two or more time sub-slots or two or more frequency sub-bands, or the like (e.g., sub-portions) for transmission of a preamble. The sub-portions can be assigned to one or more selected BSs. Further, some portions can be reserved for BSs of a particular type (e.g., access time, transmit power, re-use type), or the like. In one aspect, each BS can have a distinct sub-slot in which to transmit its preamble. In another aspect, where more BSs exist than sub-slots, frequency re-use can be implemented for one or more sub-slots. Thus, two, three or more BSs can be assigned to frequency sub-bands of a sub-slot. In some aspects, the assignment can be planned such that a BS employs the same sub-slot for each superframe/cycle of a wireless signal. In such aspects, terminal devices need only scan a single signal resource to obtain a pertinent preamble transmission. In other aspects, the assignment can be random, pseudo-random, or the like (e.g., based on a random or pseudo-random number generation algorithm), such that the BS transmits a preamble in different resources of different superframes/cycles of the wireless signal (e.g., employing dynamic allocation, as discussed above). Dynamic allocation can be employed to reduce likelihood of consecutive collisions with a dominant interfering BS. In at least one additional aspect, the assignment can be based at least in part on collision feedback from terminal devices, and can be implemented to mitigate substantial disparity in transmit power of multiple BSs on a common sub-slot.

Providing for both time and frequency re-use of BS and sub-slot assignment can help to mitigate desensitization problems, discussed above. For instance, where signal power disparity of multiple signals obtained at a receiver is great, a weaker signal may be unreadable even where the signals are transmitted in different frequency sub-slots (e.g., orthogonal frequency sub-slots employing frequency re-use) This can occur, for instance, where the weaker signal is received below the quantization noise floor. In this case, receiving the signals at two different times can lead to comprehension of both signals. Thus, in the learned re-use scheduling, high disparity in received signal strength can be avoided by scheduling two signals into different time sub-slots of the wireless signal. Further, in the random/pseudo-random/time-varying re-use scheduling, a probability exists that the two such signals will not collide in a resource of one superframe even where they collide in another resource of another superframe. In such aspects, by monitoring multiple sub-slots over multiple superframe transmissions of the wireless signal, a receiver will eventually receive a sub-slot where the weaker signal does not co-exist in a sub-slot with the much higher power transmitter.

In some examples disclosed herein, BSs can be required to blank signal resources reserved for other BSs. As an example, a macro BS (e.g. high power GA BS) can be required to blank a time frame reserved for RA BSs. This can result in an automatic repeat-request (ARQ) (or, e.g., hybrid ARQ or [HARQ]) timeline of the macro BS being interrupted. In such case the macro BS can be unable to transmit assignments or acknowledgements for reverse link (RL) traffic. Accordingly, in some aspects of the disclosure, the BS can group two blanked frames on a common interlace together (e.g., in a UMB system, two frames separated by seven frames in between), and assign/acknowledge the grouped frames together. Assignment information can be scheduled prior to the grouped frames and acknowledgement information after. Thus, as an example, assignment frames preceding the blanked frames could apply to two RL frames, and acknowledgement frames following the blanked frames could apply to two other RL frames. Accordingly, HARQ functions can be implemented in conjunction with such designated frames.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g. data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the Figures, FIG. 1 illustrates a wireless communication system 100 with multiple base stations 110 (e.g., wireless APs) and multiple terminals 120 (e.g. UTs), such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal 120 can be fixed or mobile. Terminals 120 can also be called a mobile station, user equipment, a user device, or some other terminology, as described above. A terminal 120 can be a wireless device, a cellular phone, a personal digital assistant (PDA), a wireless modem card, and so on. Each terminal 120 can communicate with zero, one, or multiple base stations 110 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 130 couples to base stations 110 and provides coordination and control for base stations 110. For a distributed architecture, base stations 110 can communicate with one another as needed (e.g., by way of a backhaul network communicatively coupling the base stations 110). Data transmission on the forward link often occurs from one access point to one access terminal at or near the maximum data rate that can be supported by the forward link and/or the communication system. Additional channels of the forward link (e.g. control channel) can be transmitted from multiple access points to one access terminal. Reverse link data communication can occur from one access terminal to one or more access points.

Figure 2:
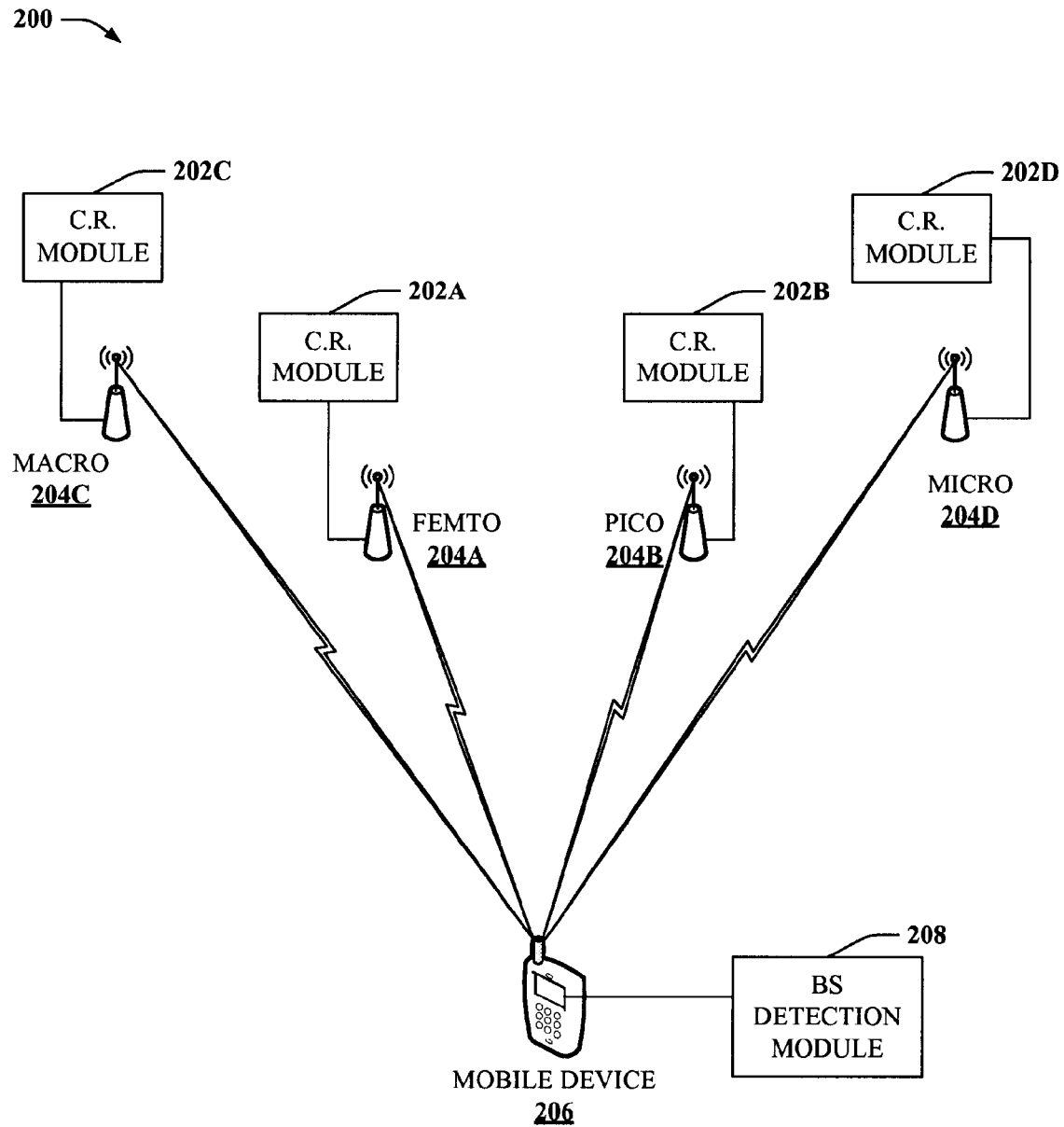
FIG. 2 depicts a block diagram of an example wireless access network (AN) comprising heterogeneous transmit power base stations (BSs).

FIG. 2 illustrates a block diagram of a sample system 200 that provides BS detection in a wireless access network (AN) comprising heterogeneous wireless base stations (BSs) (204A, 204B, 204C, 204D). It should be appreciated that the BSs 204A, 204B, 204C, 204D can be part of a synchronous or asynchronous AN. A mobile device 206 can receive wireless signals from the various BSs 204A, 204B, 204C, 204D of the wireless AN. In addition, an interference reduction apparatus 202 can manage wireless signal transmission for one or more of the BSs 204A, 204B, 204C, 204D to reduce or eliminate interference at the device 206 for at least some portions of the wireless signals transmitted by BSs 204A, 204B, 204C, 204D.

Mobile device 206 can analyze wireless signals obtained at a receiver of such device 206. For instance, the device 206 can observe control channel and/or acquisition pilot information of various signals, by scanning a portion of such signals for a signal preamble. The signal preamble can identify a base station (204A, 204B, 204C, 204D) transmitting a particular signal, instruct the mobile device 206 how to decode and demodulate the signal(s), identify a manner in which to send data to the base stations (204A, 204B, 204C, 204D) in a reverse link (RL) channel, and/or the like. Further, the mobile device 206 can select a serving base station 204A, 204B, 204C, 204D based on characteristics of a received signal (e.g., signal strength, path-loss, or the like).

As discussed above, where preambles of multiple base stations (204A, 204B, 204C, 204D) occupy a common resource (e.g., frame) of received wireless signals, the preambles can interfere with each other, becoming difficult to distinguish at the mobile device 206. To mitigate this problem, interference reduction apparatus 202 can designate a resource(s) of a wireless signal for preamble scheduling by a particular BS (204B, 204C, 204D), a particular BS type (e.g., access type, re-use type, transmit power), and so forth. For instance, one resource can be designated for GA BS preambles, so that RA BSs (204A) refrain from transmitting a preamble on such resource(s). Accordingly, preamble interference from the RA BS 204A will be reduced or eliminated. Where the resource is a particular frequency band, preamble interference can be reduced to substantially a quantization noise level between frequency bands. Where the resource is a particular time frame/sub-frame/sub-slot, etc., of the wireless signal(s), preamble interference can be substantially eliminated at the mobile device 206. Additional designation of resources of the wireless signal(s) can be introduced to further isolate preambles of the heterogeneous BSs, as is discussed in further detail below (e.g., at FIGS. 3, 4, 5 and 6, infra).

Figure 3:
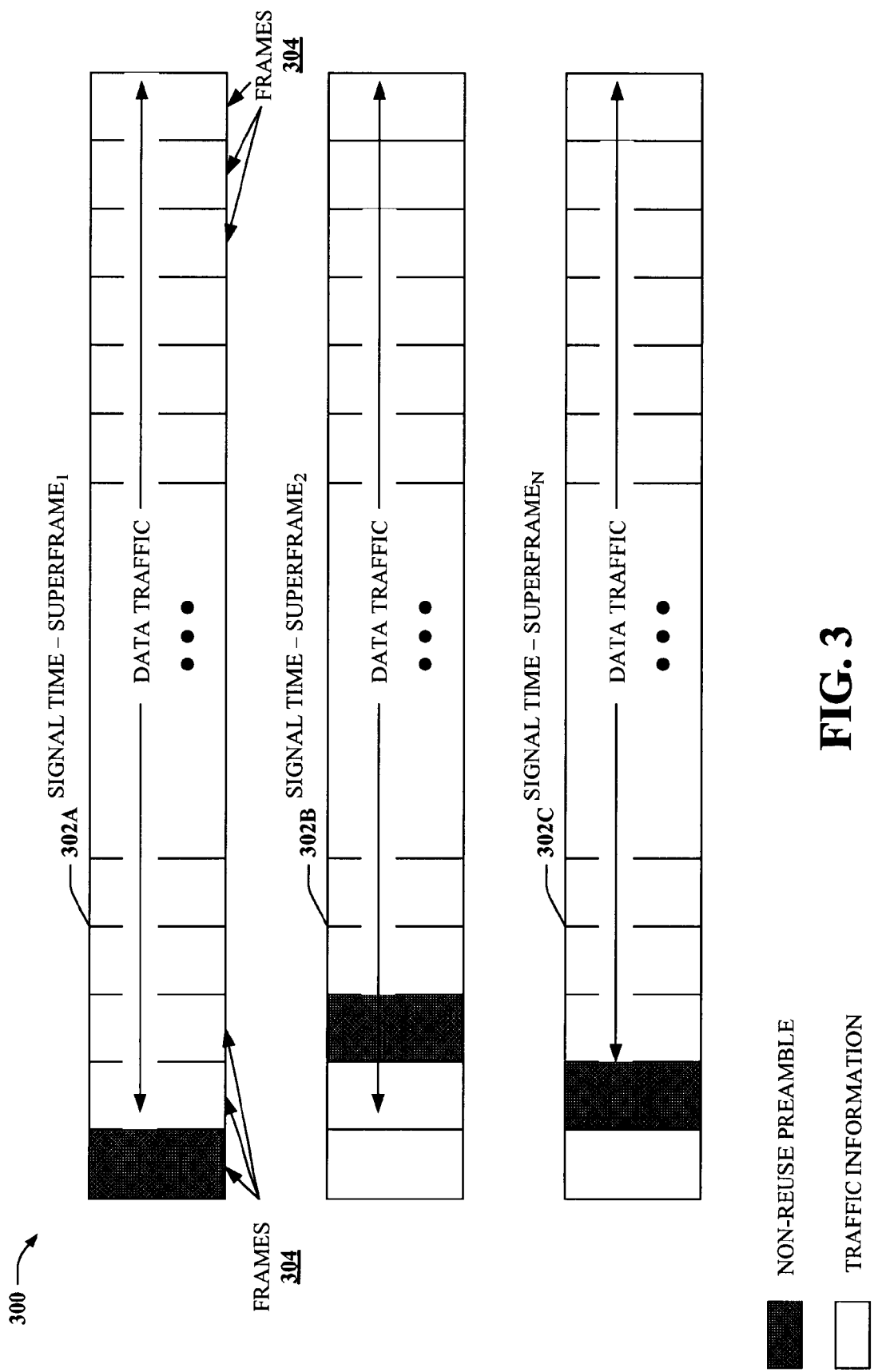
FIG. 3 illustrates a block diagram of an example wireless signal according to aspects of the subject disclosure.

FIG. 3 depicts an example of portions of a wireless signal 300 according to aspects of the subject disclosure. The wireless signal 300 comprises three time frames 302A, 302B, 302C. The time frames 302A, 302B, 302C can be superframes of a UMB signal, or other suitable time segments (e.g. cycle) of a signal generated by a different type of wireless communication system (e.g., third generation partnership project [3GPP] long term evolution [LTE], global system for mobile communication [GSM], universal mobile telecommunications system [UMTS], or a like system). The time frames (302A, 302B, 302C) can be any suitable period of time (e.g., 25 milliseconds) according to suitable requirements of a communication system. As depicted, the time frames 302A, 302B, 302C can be further segmented into multiple time-based portions 304 (e.g., frames of substantially 1 millisecond duration, or other signal resources). Each portion 304 (e.g., resource) can be utilized for transmission of wireless information (e.g., using all time, frequency, symbol, and/or code resources of the portion), including a preamble, traffic data, and the like. It should further be appreciated that a fraction of a resource can also be utilized to transmit the wireless information (e.g., using only a subset of the time, frequency, symbol and/or code resources of the portion). Furthermore, various BSs can dynamically allocate their preambles to different signal resources for different time frames 302A, 302B, 302C (e.g., as indicated by the gray time frame of the various superframes 302A, 302B, 302C). Such an arrangement can reduce preamble collisions from dominant interferers over multiple time frames 302A, 302B, 302C.

In addition to the foregoing, at least one portion of the signal time frames 302A, 302B, 302C can be allocated to a preamble for different BSs and/or different types of BSs. Thus, as depicted, a portion can be reserved for a preamble of non-reuse BSs, as depicted by cross-hatch pattern in the first, third and second portions of the signal time frames 302A, 302B, 302C, respectively. Furthermore, the portion allocated to preambles of non re-use BSs can be restricted with respect to preambles of re-use BSs (or, e.g., vice versa, such that a resource allocated to re-use BSs are restricted to non re-use BSs). Accordingly, a mobile device (not depicted) monitoring the signal 300 for non re-use BS control and/or acquisition information can look to the portion of each signal time frame 302A, 302B, 302C without interference from re-use BSs. Furthermore, a mobile device monitoring the signal 300 for re-use BS control and/or acquisition information can ignore the portion dedicated for non re-use BSs, potentially reducing interference caused by a non re-use BS. Thus, by assigning preambles of particular BSs to particular portions (304) of a wireless signal 300, interference at least for preamble information can be either reduced or eliminated, in suitable circumstances.

Figure 4:
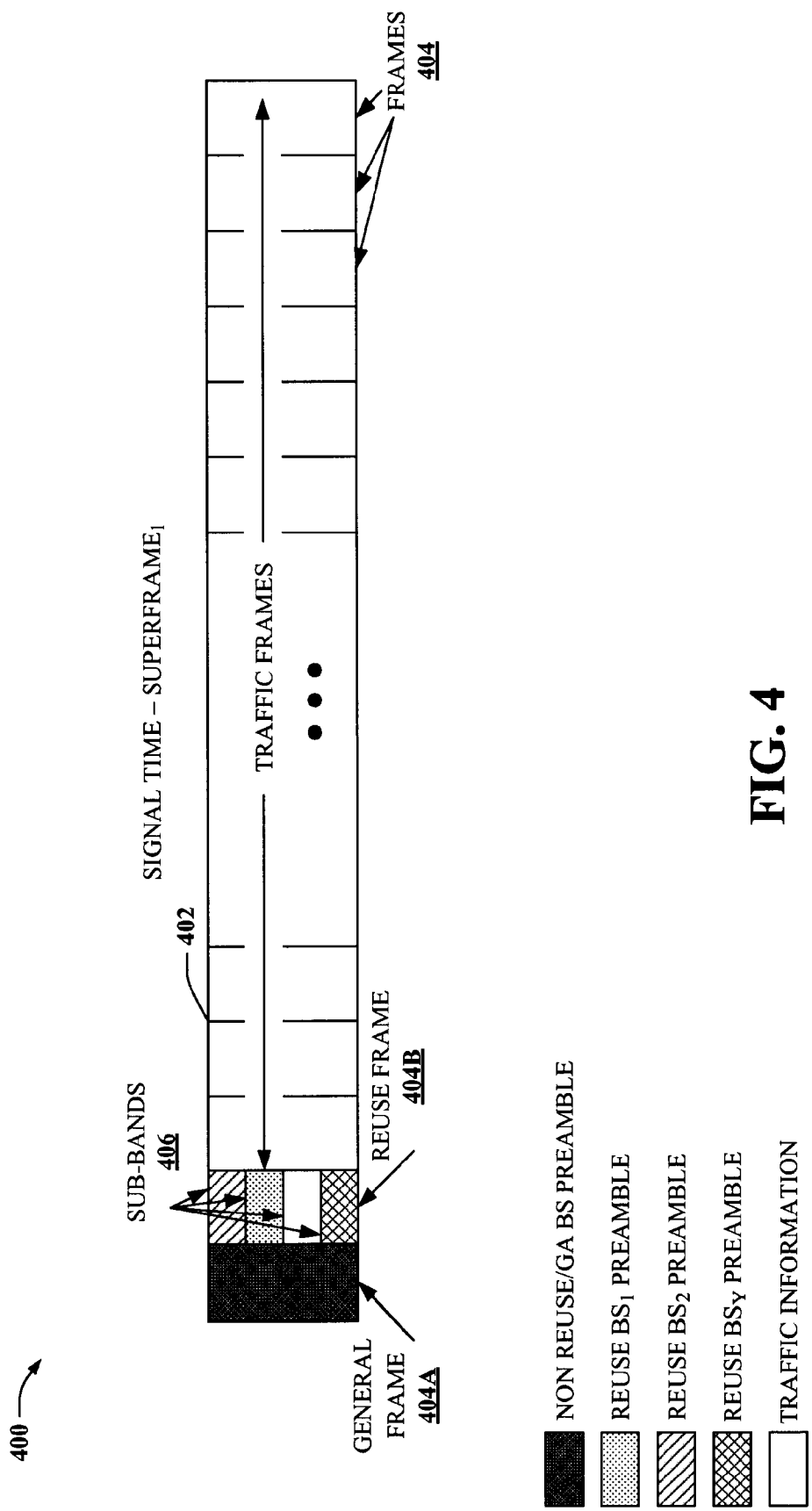
FIG. 4 depicts a block diagram of an additional example wireless signal according to further aspects of the subject disclosure.

Turning to FIG. 4, depicted is an additional wireless signal 400 according to additional aspects of the subject disclosure. Wireless signal 400 can comprise one or more signal time frames (e.g., superframes) 402. Each signal time frame 402 is further segmented into multiple portions thereof 404. The portions 404 of the signal time frame 402 can each be modulated with different communication information. According to specific aspects of the subject disclosure, signal time frame 402 can have particular portions (404) designated for preamble information (e.g., control information, acquisition information) and other portions (404) designated for traffic information. Furthermore, some portions (404) can be designated for preamble information of a particular BS or type of BS to reduce interference among preambles of multiple BSs.

As depicted, a first portion 404A of the signal time frame 404 can be designated for preamble information of non re-use BSs. Thus, such BSs can schedule and transmit preamble information at least in portion 404A. In addition to the foregoing, re-use BSs can blank the first portion 404A designated for non-reuse BSs. According to particular aspects of the subject disclosure, designated resources can vary from one superframe to another for BSs of the particular type. Thus, interference from re-use BSs in the portion 404A designated for non re-use BSs can be either reduced or eliminated, and interference from multiple non re-use BSs across multiple superframes 402 can be mitigated as well.

According to further aspects of the subject disclosure, one or more additional portions (404B) of signal time frame 402 (or, e.g., multiple such signal time frames 402) can be designated at least for re-use BSs. Thus, as an example the wireless signal 400 can have one portion 404B per time frame 402 designated at least for re-use BSs, one portion 404B per two time frames 402, etc. According to other examples, multiple portions (404B) of the time frame 402 can be designated for at least the re-use BSs. A number of designated portions (404B) for re-use BSs can be determined based on a number of such BSs in a wireless network, sector/cell of such network, or the like.

In addition to the foregoing, a portion(s) 404B of the wireless signal 400 designated for at least re-use BSs can be further segmented into two or more frequency sub-bands 406. Different re-use BSs within a wireless AN can be assigned to various frequency sub-bands 406 of the second portion 404B (or, e.g. to one of multiple such portions 404B) to reduce interference among such BSs employing the second portion 404B to transmit preamble information. Assignment of sub-bands can be implemented in at least one of several fashions. First, a suitable re-use BS (e.g. RA, mid power GA, low power GA) can be assigned to a random or pseudo-random sub-band of each such portion 404B (or, e.g., a sub-band[s] of another suitable time based portion) of wireless signal 400, by employing a random/pseudo-random number generator for instance. Thus, where BSs interfere in one sub-band 406 of a signal time frame 402, it is unlikely that the same BSs will interfere in a designated re-use BS portion 404B of another signal time frame (402). Second, assignment of sub-bands can be implemented in a pre-planned fashion, such that particular BSs are assigned to particular sub-bands of the RA BS portion 404B of the signal time frame 402. Such aspects can be beneficial, for instance, where fewer BSs utilizing the second portion 404B exist than sub-bands of such portion 404B. In one particular aspect of the second implementation, pre-planned assignment can employ dynamic allocation, such that preambles are scheduled to different resources across different time frames (402) of a wireless signal 400. According a third implementation, assignment of sub-bands can be based at least in part on information obtained from a receiving device. For instance, where a device indicates that two BSs interfere significantly on a particular sub-band, the identified BSs can be assigned to different sub-bands of portion 404B, or to re-use BS portions 404B of separate signal time frames 402.

Regardless of which implementation is chose, designated preamble resources can be distributed to various time frames (402) of the wireless signal 400. Thus, as one particular example, one re-use BS frame (404B) can be assigned for every two signal time frames 402. Additionally, each re-use BS frame (404B) can be segmented into four different frequency sub-bands (e.g., of substantially one quarter of a total bandwidth of the signal 400). Re-use BSs are assigned to schedule their preambles in one sub-band each of every other re-use BS frame (404B), or one of eight time-frequency segments of the wireless signal 400. Accordingly, a particular BS will transmit its preamble in one re-use BS frame (404B) for every four signal time frames 402. Time-frequency re-use can be pre-planned, randomly assigned across various time frames (402), or learned (e.g., assigned based at least in part based on collision feedback information from receive devices, optionally where collision interference rises above a particular threshold interference level, a SNR drops below a threshold SNR level, a path-loss rises above a threshold path-loss level, or the like). Further, pre-planned and learned re-use can be dynamically allocated such that the planned/learned preamble assignment changes from at least one superframe 402 to another.

It should be appreciated, however, that although re-use BS can, in some aspects of the disclosure, schedule a preamble in a re-use BS frame (404B), such BSs can also employ the non re-use BS frame 404A for transmitting preamble information as well. Thus, in such aspects, the non re-use frame 404A is actually a general use frame instead. This can be useful where the dominant interferer is a high power macro BSs (e.g., typically non re-use BSs). Mid and low power GA BSs, which can typically be re-use BSs, can transmit preamble information in the general use frame (404A) as well as a particular re-use frame (404B), according to the assignment algorithms discussed above, or like algorithms. According to still other aspects, an RA BS can be allowed to transmit a preamble in the re-use frame 404B, but not the non re-use or general frame 404A. This can facilitate detection of a far away macro BS in the presence of a very close, and relatively high power transmitter, as observed at a receiver.

Figure 5:
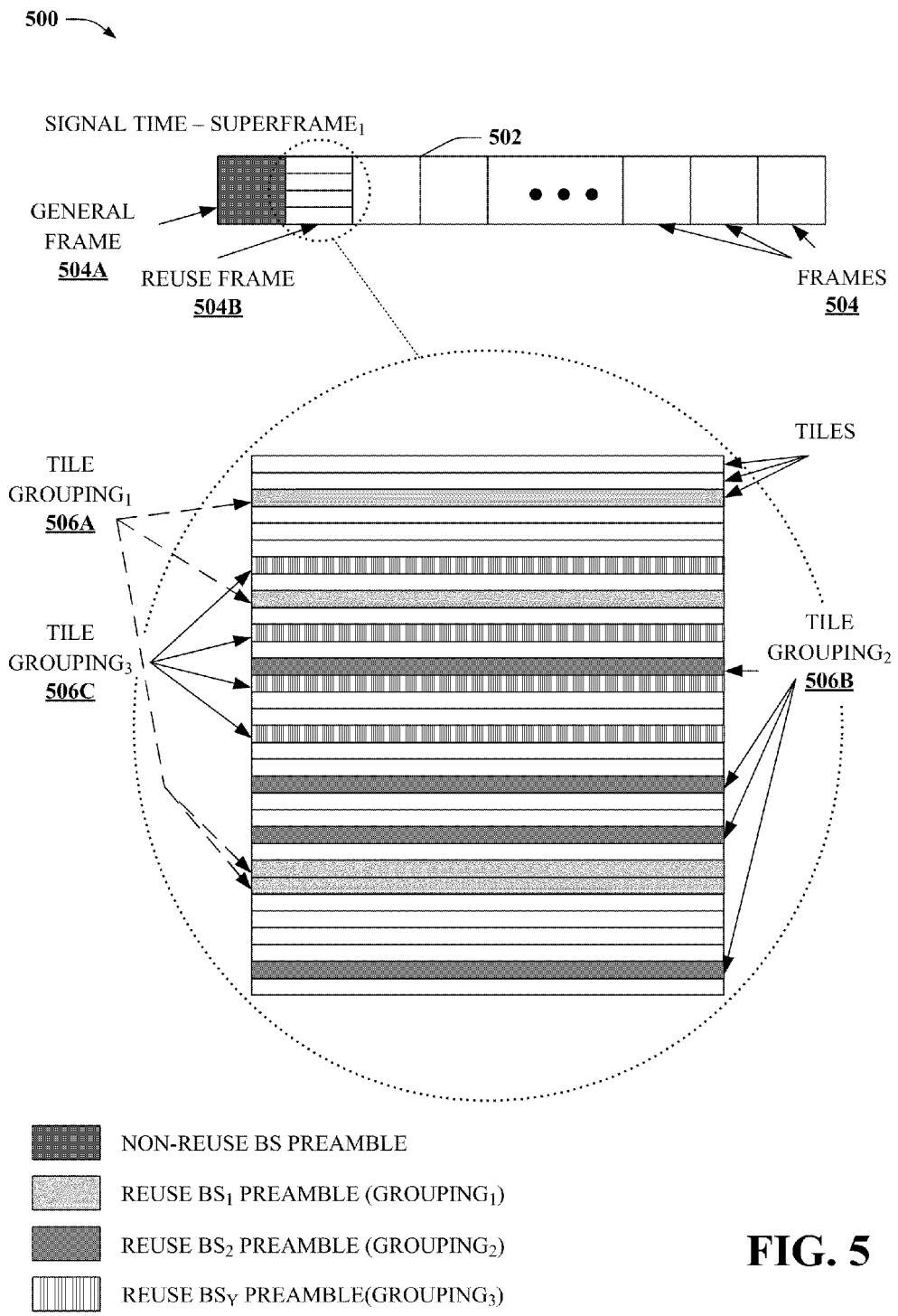
FIG. 5 illustrates a block diagram of an example wireless signal comprising frequency sub-tiles to facilitate AP detection according to some aspects.

FIG. 5 depicts an example wireless signal time frame 502 according to further aspects of the subject disclosure. Time frame 502 can comprise at least one general preamble frame 504A for transmission of a preamble by any BS (or, e.g. transmission of a preamble by any GA BS). The time frame 502 can further comprise at least one re-use preamble frame 504B restricted to preambles transmitted by BSs employing fractional resource re-use to transmit a preamble. Other frames of the wireless signal 500 can be utilized for data traffic. In at least one aspect of the disclosure, location of the general frame 504A and the re-use frame 504B can vary from superframe (502) to superframe (502) (e.g. in a planned manner, random or pseudo-random manner, learned manner, or the like).

In at least some aspects of the subject disclosure, the re-use frame(s) 504B can be subdivided into a set of frequency sub-carrier tiles (e.g., of width eight sub-carriers). The sub-carrier tiles can be of substantially similar bandwidth, or selected to have different groups of bandwidths (e.g., a first subset of the tiles can have a first bandwidth; a second subset of the tiles can have a second bandwidth, and so forth). Furthermore, the sub-carrier tiles can be grouped into one or more tile groupings 506A, 506B, 506C. The tile groupings 506A, 506B, 506C can be selected from the set of tiles randomly, pseudo-randomly and/or according to a predetermined selection function. Each tile grouping 506A, 506B, 506C can comprise two or more tiles selected from the set of tiles, as stated above. Furthermore, in the case of multiple re-use frames (504B), various tiles can be selected from multiple such frames (504B), resulting in tile groupings that span multiple time frames of a signal superframe 502. In such a manner, the tile groupings 506A, 506B, 506C can provide suitable time-frequency resource combinations for transmitting data (e.g., preamble information). It should be appreciated that a tile group can, but need not, be comprised of matching tiles from the multiple re-use time frames. Thus, in one example, a first, third and fifth (or some other combination) tile from each of two or more such time frames can comprise a tile grouping. In another example, the first, third and fifth tile from a first time frame can be combined with the tenth tile from one or more other re-use time frames (or some other subset of tiles from the first and other re-use time frames) to form a suitable tile grouping.

According to further aspects of the disclosure, one or more BSs can select at least one tile grouping 506A, 506B, 506C for transmission of preamble information. For instance, a first BS can select tile grouping$_1$ 506A and a second BS can select tile grouping$_2$ 506B for transmission of signal preambles associated with such BSs. Selection can be random or pseudo-random (e.g., based on a random or pseudo-random number generator), planned according to a particular algorithm, or based on collision feedback information to mitigate preamble collisions. Furthermore, selection can employ dynamic allocation as described herein, such that selection of tile grouping for a BS can vary from one superframe (502) to another superframe (502) of the wireless signal 500.

Further to the above, it should be appreciated that all or a portion of all of a signal preamble can be transmitted in each tile of a selected tile grouping 506A, 506B, 506C. Thus, a BS can transmit control channel information in tiles of a grouping 506A, 506B, 506C. Alternatively, or in addition, the BS can transmit synchronization signals in the tiles of the tile grouping 506A, 506B, 506C. By transmitting preamble information, or a subset of such information, in multiple tiles of a tile grouping 506A, 506B, 506C, effects of a dominant interfering transmitter can be mitigated. As a particular example, if the dominant interferer collides with a transmitting BS on one tile of a tile grouping 506A, 506B, 506C, it is likely that another such tile will have reduced or no interference from the dominant interferer. Accordingly, a receiving device (e.g., mobile terminal) can acquire a signal from the transmitting BS on at least one such tile of a tile grouping 506A, 506B, 506C.

Figure 6:
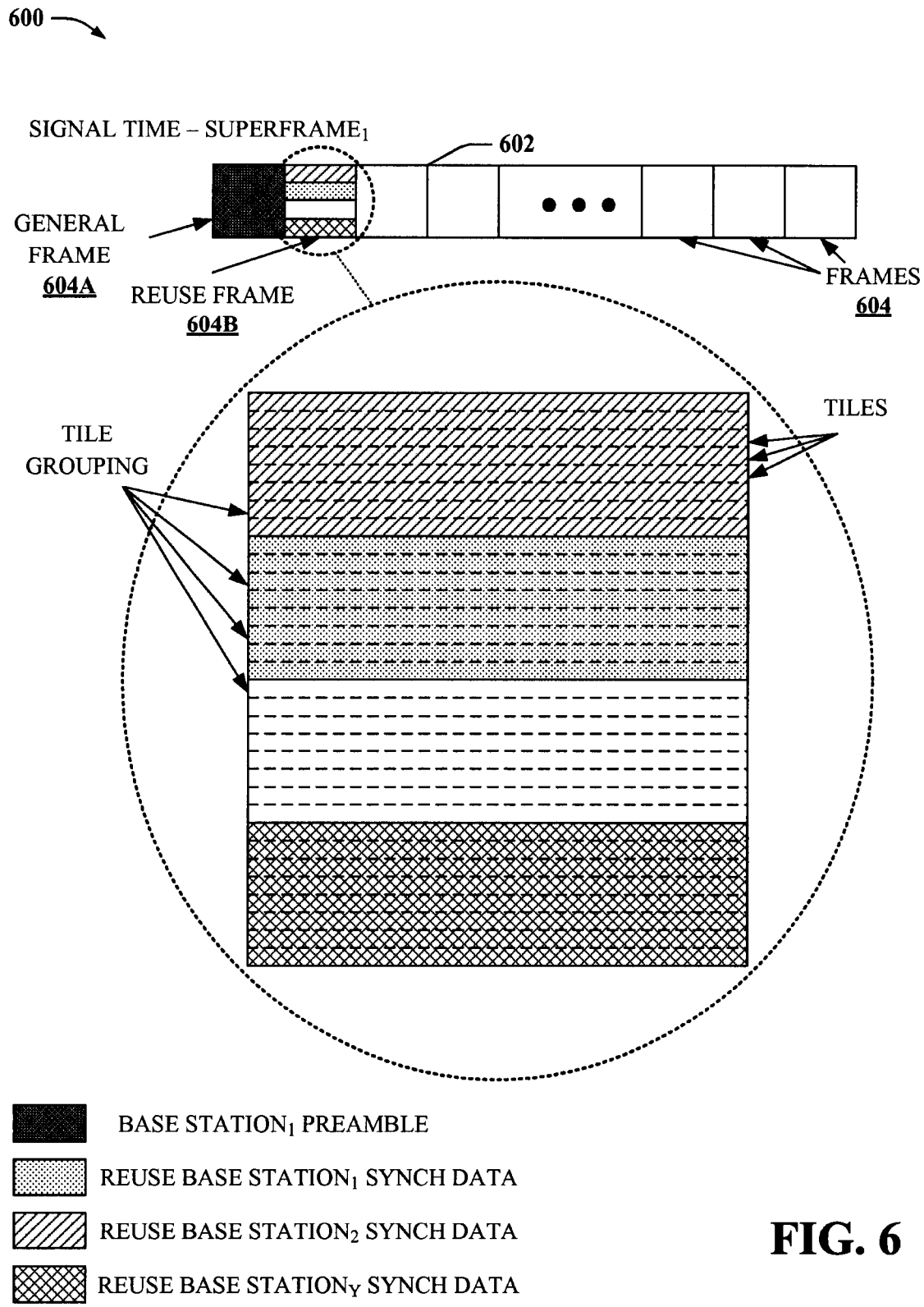
FIG. 6 illustrates a block diagram of another example wireless signal comprising frequency sub-bands and sub-tiles according to further aspects.

FIG. 6 illustrates an example wireless signal time frame 602 according to additional aspects of the subject disclosure. Similar to the signal time frame illustrated in FIG. 4 402, supra, signal time frame 602 comprises several smaller time-based portions 404 (e.g., frames) of the signal time frame 602. A first portion(s) 604A of the signal time frame 602 can be dedicated for preamble information of any suitable BS, or for a general type of BS such as a GA BS, as described herein. Furthermore, a second portion(s) 604B of the signal time frame 602 (or, e.g. of multiple such signal time frames 602, such as one portion 604B per two signal time frames 602, or the like) can be dedicated for preamble information of re-use BSs (e.g., micro cells, pico cells, femto cells, etc.). Additionally, macro cell BSs can blank the second portion 604B. Optionally, RA BSs can blank the first portion 604A. In such an arrangement, preamble interference at least of the macro and RA BSs can be reduced or eliminated by blanking the respective time frames 604A, 604B.

In addition to the foregoing, the second portion 604B of signal time frame 602 can be further divided into frequency sub-bands. Applicable re-use BSs (e.g., RA BSs, mid power GA BSs, low power GA BSs) can transmit at least a portion of preamble information in at least one such frequency sub-band of one or more signal time frames 602 as described herein. In at least one aspect of the subject disclosure, re-use BSs can schedule synchronization signals to at least one of the frequency sub-bands of the re-use time frame 604B. Assignment of such sub-bands and/or second portion(s) 604B can be planned or random/pseudo-random, or can be learned based on collision feedback information of mobile devices served by BSs of a wireless AN, or a combination thereof. Accordingly, BSs employing the second portion(s) 604B can be separated in frequency, by the various sub-bands, or in time, by portions 604B separated by distinct signal time frames 602, or both, reducing interference of RA and/or mid-low power GA BSs.

In addition to the foregoing, the frequency sub-bands of the re-use time frame 604B can further be sub-divided into sets of frequency sub-carrier tiles, as discussed at FIG. 5, supra. One or more tile groupings can be established comprising a subset of the sets of tiles. Such tile groupings can be determined as described herein (e.g., pseudo-randomly, based on a selection function, or the like). In some aspects, tiles are grouped within a common frequency sub-band. In other aspects, tiles can be grouped across frequency sub-bands. According to further aspects, control channel information of a re-use BS (e.g., F-PBCCH, F-SBCCH, F-QPCH information) can be scheduled to each tile of at least one tile grouping. Thus, in such aspects, any suitable tile of a tile grouping can convey the control channel information. According to further aspects, tiles can be randomly/pseudo-randomly grouped together to reduce effects of dominant interference in one or more of the tiles. By employing randomly/pseudo-randomly selected tiles for a grouping, if a subset of tiles see dominant interference, one or more other tiles can provide the control channel information.

As one particular example, a re-use BS can schedule a portion of preamble information into a frequency sub-band of the re-use time frame 604B and another portion of the preamble information into a selected tile grouping. As a more particular example, synchronization information (e.g., a primary synchronization sequence [PSC] secondary synchronization sequence [SSC], TDM synchronization codes of a UMB system, and so on) can be scheduled to one frequency sub-band of the re-use frame (604B), as discussed above, whereas the control channel information can be scheduled to the selected tile grouping. Such an arrangement provides additional diversity for preamble data of a wireless signal.

According to one or more other aspects, each sector/BS employs a randomly/pseudo-randomly chosen tile grouping to transmit control channel information. Since different sectors employ independent tile groupings, a dominant interferer might collide with a weaker sector on some tiles, but is unlikely to collide on all tiles. With high probability, some tiles will be free of dominant interference and the control channel information can be decoded successfully. In addition, each tile can carry pilot information for the tile so as to allow a receiving device to determine the channel and interference value over that tile. In some aspects, collision and/or interference information can be reported back to an interference reduction apparatus (not depicted, but see FIG. 2 at 202, supra) which can specifically separate colliding BSs into different tile groupings. It should be appreciated that a size (e.g., bandwidth), number or pilot location of tiles employed for a portion 604B of signal time frame 602 can be subject to change based on further optimization (e.g. with respect to prevailing wireless AN conditions).

Figure 7:
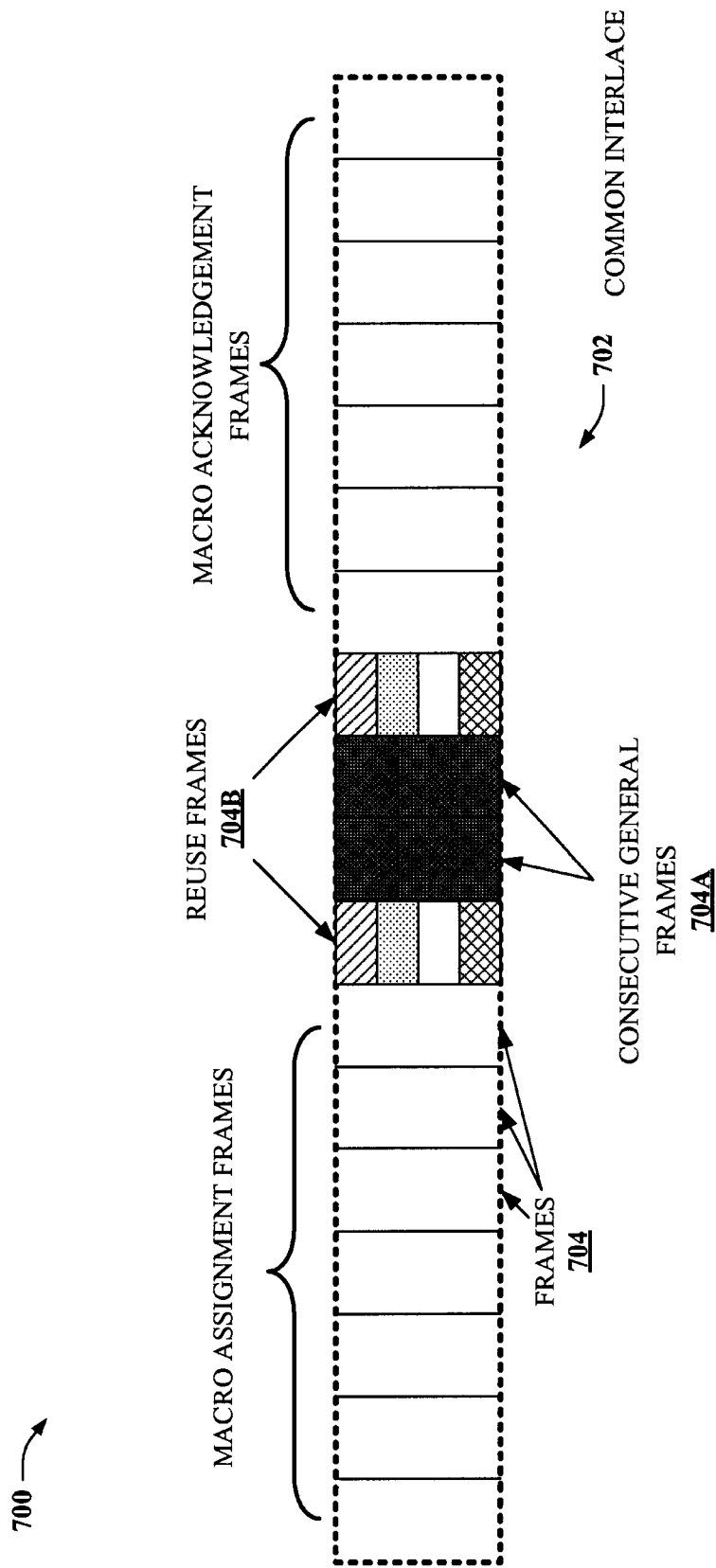
FIG. 7 depicts a block diagram of an example signal interlace according to one or more other aspects of the subject disclosure.

FIG. 7 illustrates an example wireless signal 700 according to still other aspects of the subject disclosure. Specifically, wireless signal 700 depicts a single interlace 702 of such a wireless signal 700. One potential problem of designating particular portions (704) of a wireless signal (700) for particular types of BSs in a heterogeneous AP environment results from requiring a BS to blank one or more such portions (704B). For instance, as described herein, a macro BS can be required to blank portions (704B) of a wireless signal 700 dedicated to preamble information of re-use BSs, RA BSs, and so on. This can result in interruption of certain timeline-based functions of the macro BS, such as an Automatic Repeat reQuest (ARQ) function (or, e.g. hybrid ARQ [HARQ]). Thus, the macro BS is unable to schedule assignment or acknowledgment functions for RL traffic in such frames. To address this problem, two frames in which the macro BS can transmit preamble information (e.g., two GA BS frames or general BS frames 704A) can be grouped together on a common interlace 702 of wireless signal 700. For example, in the case of a UMB system having eight interlaces, two such macro BS frames (704A) can be grouped with seven intervening frames. The frames 704A can be assigned/acknowledged together by the macro BS. Accordingly, assignment frames prior to a blanked frame (e.g., 704B) can apply to two RL frames, and assignment frames after a blanked frame (704B) can apply to an additional two RL frames. Accordingly, the timeline-based functions can be carried out by the macro BS without significant interruption by the blanked frame(s) (704B).

According to additional aspects, portions (704A, 704B) of a signal 700 dedicated for signal preamble information can be organized to reduce processing of an 'idle' receiving device (e.g., mobile device). For instance, in order to implement handoff operations, a mobile device typically has to search periodically for signals of neighboring BSs (e.g., see FIG. 2, supra). The mobile device will typically become active, or leave 'idle' mode, and process received preambles of a serving BS as well as one or more neighboring BSs. In the present context, this could include a preamble signal portion utilized by a macro BS as well as one or more preamble portions utilized by RA BSs. Thus, as an example, where a preamble of the macro BS is scheduled at a first portion (e.g., frame) of a signal time frame (e.g., superframe) and a preamble of the RA BS is scheduled at a middle portion of the signal time frame, the mobile device would have to wake up at least twice per signal time frame, increasing processing power and power consumption at the mobile device. According to at least one aspect of the subject disclosure, a first portion (704B) of a signal reserved for one BS or BS type can be placed consecutively with a another portion (704A) of the signal 700 reserved for another BS or BS type. In addition, a first signal time frame can have the preambles transmitted at the terminating portions of the signal time frame, and a subsequent signal time frame can have the preambles transmitted at the beginning portions of such time frame. Thus, a mobile device can be actively processing preamble information once per signal time frame, on average, and remain 'idle' for the remainder of the signal time frame, minimizing the number of distinct wake-ups for such device.

Figure 8:
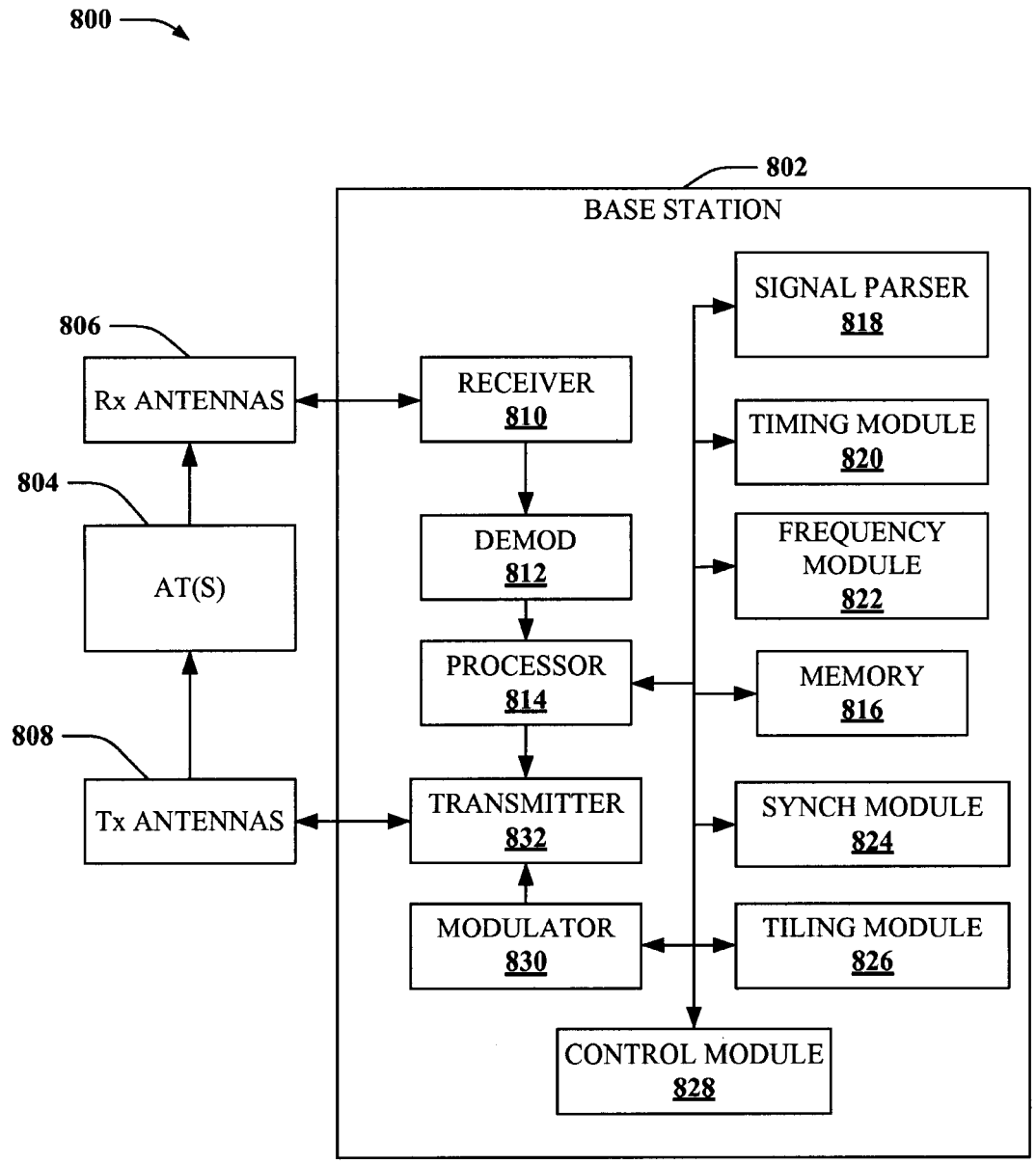
FIG. 8 illustrates a block diagram of an example system that comprises a base station configured to facilitate BS detection in a heterogeneous BS network.

FIG. 8 depicts a block diagram of an example system 800 comprising a base station 802 and one or more ATs 804 (e.g., mobile devices) according to aspects of the subject disclosure. Base station 802 can be configured to reduce interference for a wireless AN by managing preamble scheduling according to transmit power (e.g., macro BS, high power, mid power, low power), re-use type (e.g., non re-use, re-use) and/or access type (e.g., GA, RA) of base station 802. Base station 802 can be configured to schedule preamble information of wireless signals into one or more selected portions of the wireless signal, as described herein. Furthermore, the base station 802 can employ dynamic allocation across multiple superframes/cycles of a wireless signal (e.g., random/pseudo-random scheduling and/or feedback-based scheduling), according to some aspects, to reduce collisions with preambles of other base stations (not depicted) on particular channel resources.

Base station 802 (e.g., access point, ...) can comprise a receiver 810 that receives signal(s), and over-the-air (OTA) messages from one or more ATs 804 through one or more receive antennas 806, and a transmitter 832 that transmits coded/modulated OTA messages provided by modulator 830 to the one or more ATs 804 through a transmit antenna(s) 808. Receiver 810 can receive information from receive antennas 806 and can further comprise a signal recipient (not shown) that receives uplink data transmitted by AT(s) 804. Additionally, receiver 810 is operatively associated with a demodulator 812 that demodulates received information. Demodulated symbols are analyzed by a processor 814. Processor 814 is coupled to a memory 816 that stores information related to functions provided by base station 802. In one instance, stored information can comprise protocols for parsing wireless signals and scheduling forward link (FL) and RL transmissions to one or more time and/of frequency sub-divisions of a signal. Particularly, the stored information can comprise rules for scheduling preamble information into a random or predetermined portion of a wireless signal, blanking one or more other portions of the wireless signal, obtaining signal collision information from AT(s) 804, avoiding additional collisions based on random and/or learned scheduling, or the like, as described herein.

According to some aspects, processor 814 can be coupled to a signal parser 818 that can schedule a signal preamble of base station 802 into a first portion of a signal time frame. Additionally, signal parser 818 can blank, or schedule no information in, a second portion of the signal time frame reserved for base stations of a disparate type, as compared with base station 802. For example, where base station 802 is a macro BS, a portion(s) of a signal dedicated to re-use BSs can be blanked. In another example, where base station 802 is a RA BS, a portion(s) of a signal dedicated to GA BSs can be blanked. Alternatively, or in addition, where base station 802 is a mid power or low power GA BS, the base station 802 can schedule a preamble in a portion(s) dedicated for GA BSs, a portion(s) dedicated for RA BSs, or both. In addition to the foregoing, base station 802 can dynamically allocate a signal preamble to different resources of two or more superframes/cycles of a signal, as described herein.

The processor 814 can additionally be coupled to a timing partition module 820 that reserves a subset of the set of signal resources and restricts non re-use preamble scheduling from the resources of the subset. Thus, where base station 802 is a high power non re-use transmitter (e.g., macro BS), timing partition module 820 can restrict signal parser 818 from scheduling preamble signals in the reserved subset of time frames. According to some aspects, timing partition module 820 can provide a plurality of time frames for each of one or more superframes for RA BSs and, optionally, for low power or mid power GA BSs. As an example, the timing partition module 820 can provide two time frames for every four superframes, and designate such time frames for re-use BSs. In such circumstances, where base station 802 is an RA BS or low/mid power BS, signal parser can schedule a preamble into two or more of the provided time frames to limit frequency desensitization of the preamble at AT(s) 804 (e.g., by transmitting the preamble at two distinct times, likelihood of collision at a common time with another BS can be reduced). Where base station 802 is a high power BS, timing partition module 820 can restrict signal parser 818 from scheduling a preamble in such time frames, reducing interference between such high power BS and other BSs, at least with respect to the provided time frames.

In addition to the foregoing, where base station 802 blanks one or more resources of a wireless signal, timing partition module 820 can group two time frames of a common interlace of such signal. The signal parser 818 can transmit preamble information into the grouped time frames. In addition, to maintain continuity for timeline-based functions (e.g., ARQ or HARQ functions), signal parser can further schedule assignment information into time frames preceding the grouped time frames, and acknowledgement information into time frames following the grouped time frames.

According to one or more other aspects, processor 814 can further be coupled to a frequency partition module 822. Frequency partition module 822 can divide at least one resource of a wireless signal into a plurality of frequency sub-bands. One of the frequency sub-bands can be utilized for preamble scheduling by signal parser 818 (e.g. where base station 802 is a re-use BS). According to one or more aspects, the signal parser can schedule preamble information into frequency sub-bands of multiple signal superframes/cycles according to various scheduling algorithms. For instance, such scheduling can be planned, such that a specified sub-band of the time frame is utilized, randomized, such that a random or pseudo-random sub-band of the signal superframes/cycles (or, e.g., of one of multiple superframes/cycles) is utilized, or learned, such that a sub-band is selected to reduce collisions with other base stations based on collision feedback information from the AT(s) 804. Base station 802 can further comprise a synchronization module 824 that can further schedule synchronization information of the preamble. For instance, a PSC or SSC, or like synchronization pilot signal, can be scheduled into one of the frequency sub-bands, utilizing some or all of the bandwidth provided by such sub-band. In addition, the synchronization information can be scheduled to different time frames provided by timing partition module 820 to reduce likelihood of signal desensitization at AT(s) 804.

According to at least one other aspect, base station 802 can further comprise a tiling module 826 that sub-divides a signal resource (e.g., one or more frequency sub-bands of a time frame) into a set of frequency sub-carrier tiles, as described herein. The sub-carriers tiles can be grouped by tiling module 826 into tile groups. A control schedule module 828 can randomly/pseudo-randomly schedule control channel information of the preamble into tiles of a selected tile grouping. Thus, where AT(s) 804 are unable to demodulate one tile to obtain the control channel information (e.g., as a result of a dominant interferer on such tile), another such tile can be scanned to obtain such information. By employing randomly/pseudo-randomly grouped tiles, a high probability of decoding the control channel information exists even where significant interference occurs in portions of a time frame dedicated to preamble information of base station 802.

Figure 9:
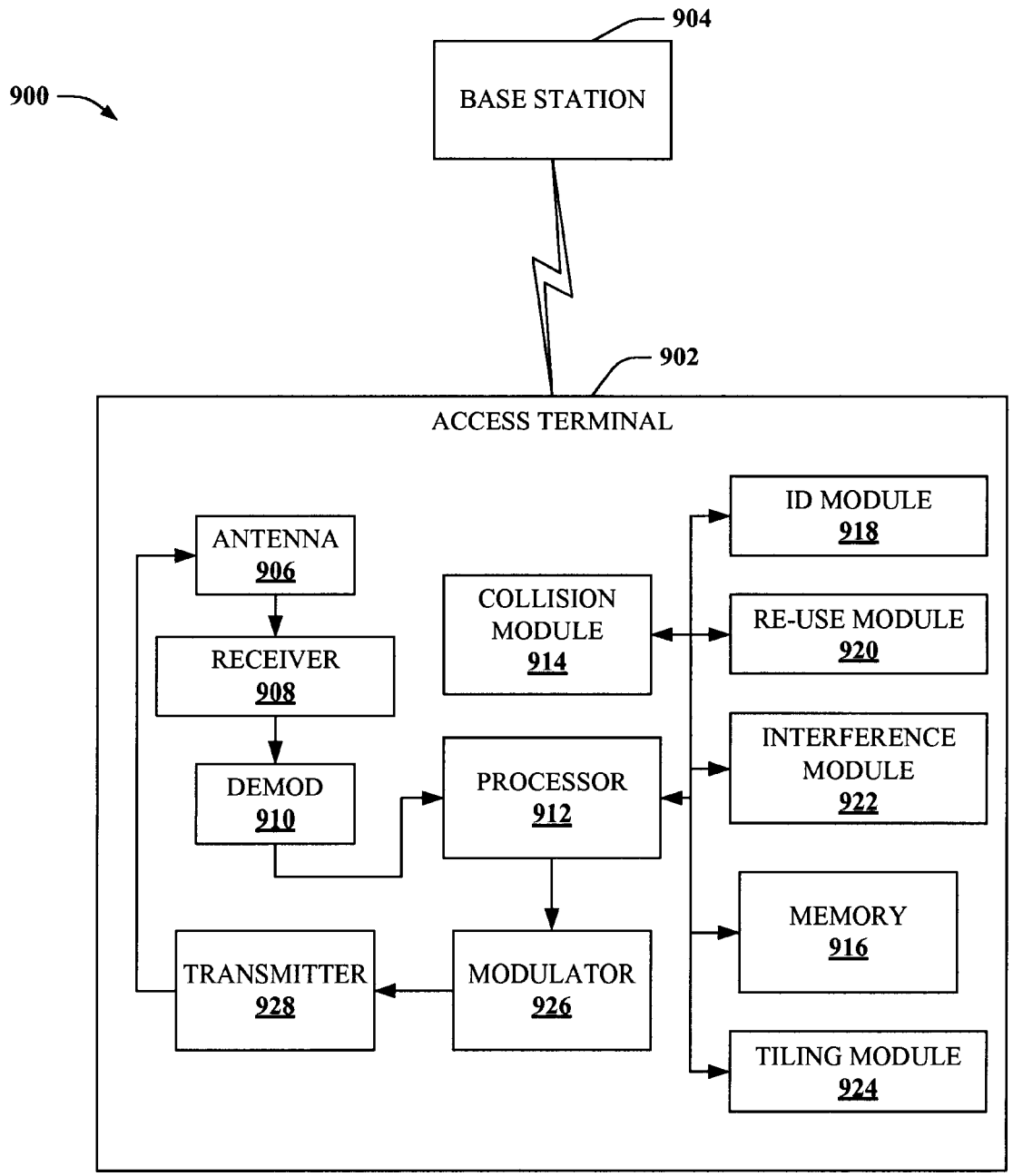
FIG. 9 depicts a block diagram of a sample system that comprises an access terminal (AT) that facilitates BS detection in wireless communication.

FIG. 9 illustrates a block diagram of an example system 900 comprising an AT (e.g., a UT) 902 that can be configured for detection of a wireless BS. AT 902 can be configured to wirelessly couple with one or more such base stations 904 (e.g., access point) of a wireless AN. AT 902 can receive OTA messages from the base station 904 on a FL channel and respond with OTA messages on a RL channel, as known in the art. In addition, AT 902 can obtain preamble information transmitted by the base station 904 by scanning selected portions of a wireless signal, based on a type (e.g., transmit power, access type, re-use type) of the base station 904, or simply based on an ID of the base station 904. For instance, AT 904 can scan one portion of the wireless signal if base station 904 is a high power transmitter, and a different portion of the wireless signal if base station 904 is a re-use transmitter (e.g. mid/low power transmitter or RA transmitter), as described herein.

AT 902 includes at least one antenna 906 (e.g., a transmission receiver or group of such receivers comprising an input interface) that receives a signal (e.g., wireless OTA message) and receiver(s) 908, which performs typical actions (e.g., filters, amplifies, down-converts, etc.) on the received signal. According to at least some aspects, processor(s) 912 can selectively analyze portions of signals received from demodulator 910 and obtain synchronization and/or control information pertinent to a selected base station (904) or type of base station. In general, antenna 906 and transmitter 928 (collectively referred to as a transceiver) can be configured to facilitate wireless data exchange with base station(s) 904.

Antenna 906 and receiver(s) 908 can also be coupled with the demodulator 910 that can demodulate received symbols and provide them to processor(s) 912 for evaluation. It should be appreciated that processor(s) 912 can control and/or reference one or more components (906, 908, 910, 914, 916, 918, 920, 922, 924, 926, 928) of the AT 902. Further, processor(s) 912 can execute one or more modules, applications, engines, or the like (914, 918, 920, 922, 924) that comprise information or controls pertinent to executing functions of the AT 902. For instance, such functions can include scanning received wireless signals for control/synchronization information, identify base stations (904) transmitting such signals, determine interference and/or interfering base stations (904), report collisions observed on a portion of the signals, or like operations, as described herein.

AT 902 can additionally include memory 914 that is operatively coupled to processor(s) 912. Memory 914 can store data to be transmitted, received, and the like, and instructions suitable to conduct wireless communication with a remote device (904). Further, memory 916 can store the modules, applications, engines, etc. (914, 918, 920, 922, 924) executed by processor(s) 912, above. According to some aspects, antenna(s) 906 can obtain a wireless communication signal from base station 904 comprising at least a first and second time cycle. Processor(s) 912 can obtain a signal preamble from one resource (e.g., time, frequency, symbol and/or code division) of the first time cycle and from a different resource of the second time cycle (e.g., based on preamble re-use of such cycle resources). According to other aspects, the processor(s) can additionally scan at least one additional resource of the first or second time cycles of the wireless signal to obtain preamble data of a mid to low power transmitter, a high power transmitter, a GA transmitter or an RA transmitter, or a combination thereof. The at least one additional resource can be utilized by a base station 904 to reduce signal desensitization at receivers (e.g., 908), by repeating preamble information in a separate time frame of the signal.

According to additional aspects, processor(s) 912 can scan one or more frequency sub-bands (or, e.g., other resources) of a time frame, or all frequency sub-bands (or other resources) of the time frame, in order to identify and obtain a signal preamble or portion thereof. Scanning selected resources can be employed in conjunction with planned re-use of the preamble, whereas scanning all such sub-bands can be employed in conjunction with random/pseudo-random re-use of the preamble, for instance. According to further aspects, an ID module 918 can extract identifying information of a serving base station 904 from a particular resource of the time frame. The identifying information can be provided, for instance, in one or more synchronization pilots transmitted by way of the resource. A base station re-use module 920 can associate the serving BS with the particular resource in conjunction with planned frequency/time frame re-use by the base station 904 (e.g., whether statically allocated across multiple signal superframes/cycles or dynamically allocated across such superframes/cycles). In such aspects, the processor(s) 912 can scan the particular resources or designated resources of subsequent signal superframes/cycles originated at base station 904 in order to obtain further preamble information provided by the serving base station 904.

In addition to the foregoing, AT 902 can comprise an interference module 922 that detects signal interference on a wireless signal resource containing a preamble of base station 904. A collision reporting module 914 can initiate a RL message that indicates the preamble collision has occurred. In some aspects, the RL message can identify the particular resource (e.g. frequency sub-band time frame or sub-slot, code, OFDM symbol, etc.) and/or an ID of the interfering base station(s), by analyzing the interfering signal(s). Collision reporting can be utilized in conjunction with learned re-use, where base station 904 schedules its preamble on a different signal resource as the interfering base station(s) in subsequent transmissions.

According to still other aspects, AT 902 can comprise a tiling module 924 that parses at least one resource of a wireless signal (e.g., a frequency sub-band) received at antenna 906 into multiple frequency sub-carrier tiles. The tiling module 924 can further match two or more of the frequency tiles that comprise a signal of a common base station 904. The matched frequency tiles can be forwarded to processor(s) 912, which can extract control channel information provided by the base station 904 from one or more of the matched tiles. Such an arrangement can be beneficial where significant interference across various sub-bands of a preamble time frame is observed. Where control channel on one tile cannot be demodulated, a different one of the matched tiles can be analyzed to attempt to demodulate such information. Accordingly, significant interference resilience can be provided by AT 902, as described herein.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include femto base station 204A, macro base station 204C, and mobile device 902 comprising collision module 914, ID module 918 and re-use module 920, or a different combination of these and other components. Sub-components could also be implemented as components communicatively coupled to other components rather than included within parent components. Additionally, it should be noted that one or more components could be combined into a single component providing aggregate functionality. For instance, timing partition module 820 can include frequency partition module 822, or vice versa, to facilitate parsing time and frequency components of a wireless signal by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 10-13. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 10:
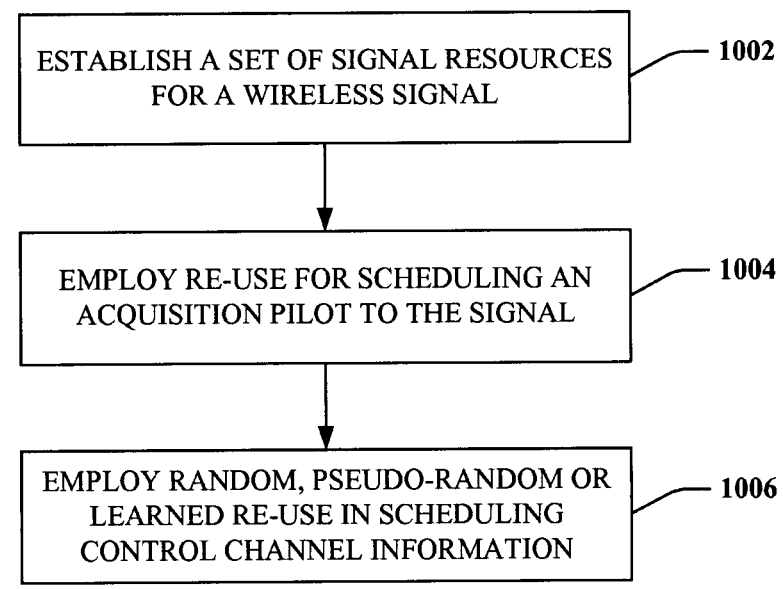
FIG. 10 illustrates a flowchart of an example methodology for BS detection in a wireless AN.

FIG. 10 illustrates a flowchart of an example methodology 1000 for enabling AP detection in a wireless AN. At 1002, method 1000 can establish a set of signal resources for a wireless signal. The resources can be time frames and/or time sub-slots, frequency sub-bands, frequency sub-carrier tiles, or a combination thereof.

At 1004, method 1000 can employ re-use for scheduling an acquisition pilot to the wireless signal. In particular, the acquisition pilot can be scheduled to different signal resources in a first cycle as compared with a second cycle of the wireless signal. It should be appreciated that the first and second cycles do not have to be consecutive cycles of the wireless signal. Rather, such cycles can be consecutive, can be separated by one or more other cycles, can be period cycles, or cycles selected based on a selection function (e.g., a random function, pseudo-random function, feedback-based function, or other suitable function for selecting resources of the wireless signal).

At 1006, method 1000 can employ random, pseudo-random or learned re-use in scheduling control channel information to the wireless signal. The random, pseudo-random or learned re-use for control channel information can be utilized instead of or in addition to the re-use for scheduling the acquisition pilot at reference number 1004. In addition to the foregoing, a resource utilized for acquisition pilot or control channel information can be reserved for a particular BS, or for a BS of a particular type (e.g., access type, re-use type, transmit power type, and so forth). For instance, one or more resources of the wireless signal can be reserved for a re-use BS, a GA BS, a low/mid power BS, and so on. If the wireless signal is transmitted by a specified BS which the resource is reserved for, the specified BS can employ such resource in scheduling pilot/control information. Otherwise, a BS or type of BS (e.g., a macro BS) can be required to blank resources reserved for a disparate BS/type of BS (e.g., a re-use BS), significantly reducing interference of preamble information at least with respect to the restricted and non-restricted BSs on that resource. Accordingly, a receiving device can analyze the resource in order to obtain preamble information of the reserved BS/BS type.

It should be appreciated that the signal resources are distinct (e.g., in time, in frequency, etc.) from other resources of the signal. Furthermore, it should be appreciated that a BS can comprise any suitable BS providing wireless access to a suitably configured terminal within range of the BS. Such BS can include a cellular base station (e.g., evolved base station [eBS], eNode B, or the like), a wireless interoperability for microwave access (WiMAX) access point, and so forth. As described, method 1000 can provide significantly reduced interference even in homogeneous BS networks, by dynamically allocating a preamble to various resources of two or more signal superframes/cycles, and optionally by requiring a BS to blank one or more portions reserved for a disparate BS or disparate BS type.

Figure 11:
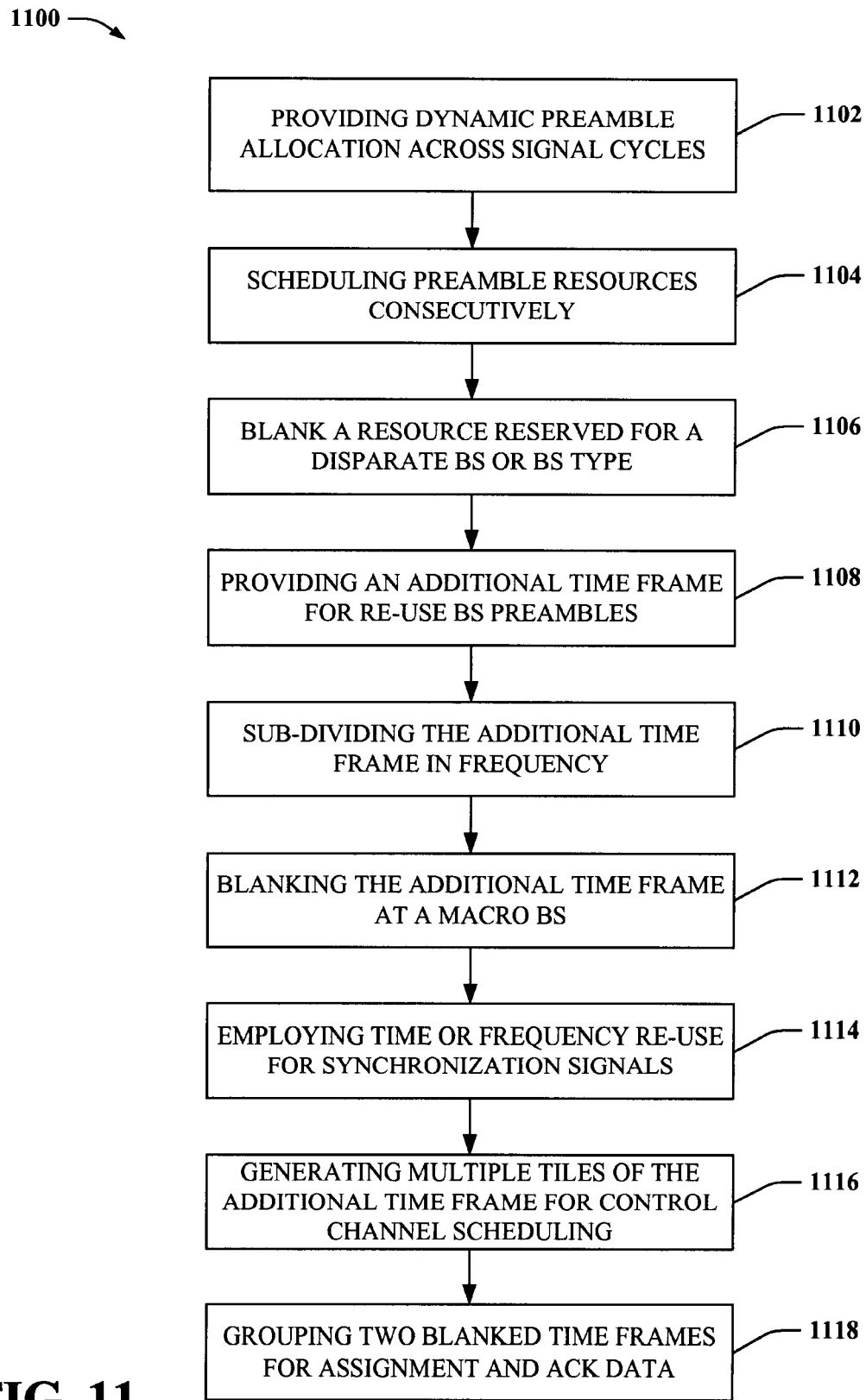
FIG. 11 depicts a flowchart of an example methodology for preamble scheduling according to one or more aspects disclosed herein.

FIG. 11 depicts a flowchart of an example methodology 1100 for preamble scheduling to reduce interference according to one or more aspects disclosed herein. At 1102, method 1100 can provide dynamic resource allocation for preamble scheduling over multiple cycles of a wireless signal, as described herein. At 1104, method 1100 can schedule two preamble resources of consecutive signal cycles in consecutive time frames of the wireless signal. Consecutive scheduling can, for instance, reduce a number of wake-up instances for mobile devices observing preamble information of multiple BSs (e.g., in conjunction with handoff determinations). At 1106, method 1100 can blank a resource reserved for a disparate BS or disparate BS type. At 1108, method 1100 can provide an additional time frame of the wireless signal or of a subsequent wireless signal(s) for preamble scheduling of re-use BSs. The additional time frame can be utilized by RA BSs and low or mid power GA BSs employing preamble re-use, as described herein. According to some aspects, a resource(s) of a wireless signal can be provided for non re-use BSs or for general scheduling of GA BSs. Further, at 1110, method 1100 can sub-divide the additional time frame into frequency sub-bands. At 1112, method 1100 can blank the additional time frame and frequency sub-bands at a non re-use BS (e.g., a macro BS). At 1114, method 1100 can employ time and/or frequency re-use for synchronization signals of a re-use BS (e.g., RA BSs, micro BS, pico BS, femto BS, etc.). Such re-use can be planned, random/pseudo-random, and/or based on collision feedback provided by one or more terminals. At 1116, method 1100 can generate multiple frequency sub-carrier tiles of the additional time frame and/or frequency sub-bands for scheduling of control channel information by the re-use BS. Tiles can be grouped together (e.g., randomly/pseudo-randomly) for repetition of control channel information, to help alleviate dominant interference at one or more of the frequency tiles. At 1118, method 1100 can group two blanked time frames of a common interlace to maintain timeline-based functions of a BS. For instance, assignment information can be scheduled previous the grouped time frames, whereas acknowledgement information can be scheduled following the grouped time frames.

Figure 12:
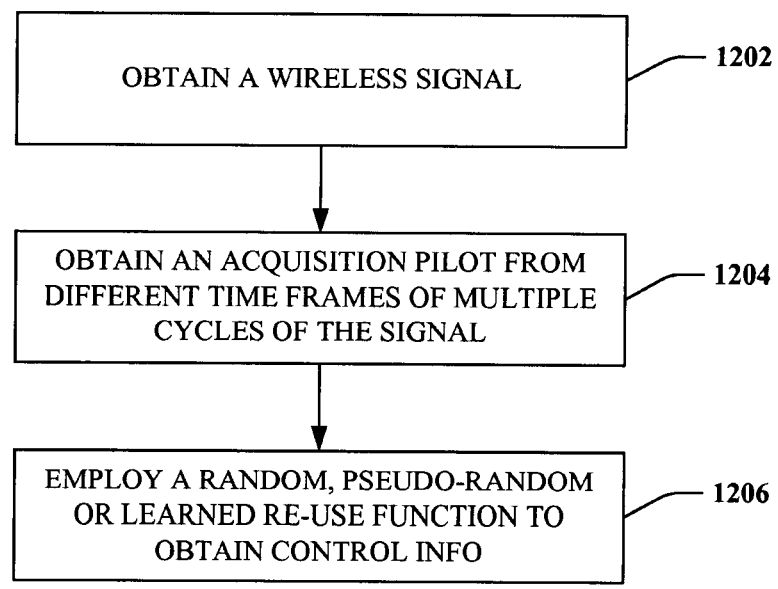
FIG. 12 illustrates a flowchart of a sample methodology for facilitating BS detection in a wireless AN.

FIG. 12 illustrates a flowchart of a sample methodology 1200 for detecting a BS in a wireless AN. At 1202, method 1200 can obtain a wireless signal. The wireless signal can comprise at least a first time cycle and a second time cycle. The time cycles can be further divided into a set of time, frequency and/or code-based resources of a wireless signal, as known in the art. At 1204, method 1200 can obtain an acquisition pilot from one resource of the first time cycle and from a different resource of the second time cycle. At 1206, method 1200 can employ a random, pseudo-random or learned re-use function to obtain control channel information from the wireless signal. Obtaining the control channel information can be in addition to, or in lieu of, obtaining the acquisition pilot at reference number 1204.

In some aspects, data included in the wireless signal can specify where the acquisition pilot or control channel information is scheduled within the wireless signal (e.g., one or more signal time frames, sub-frames, frequency sub-bands, frequency tiles or tile groups, codes or sub-codes, OFDM symbols, or other signal resources). Accordingly, in such aspects, the pilot/control information can be obtained by decoding and utilizing such data. In other aspects, the resources can be reserved for a particular BS or a BS of a particular type. Accordingly, method 1200 provides for analyzing disparate resources of a wireless signal for preamble information of a base station, depending on a type of base station signal desired. Thus, a significant reduction in interference can be achieved in a heterogeneous and/or semi or unplanned wireless AN, increasing reliability of wireless communications in such an environment.

Figure 13:
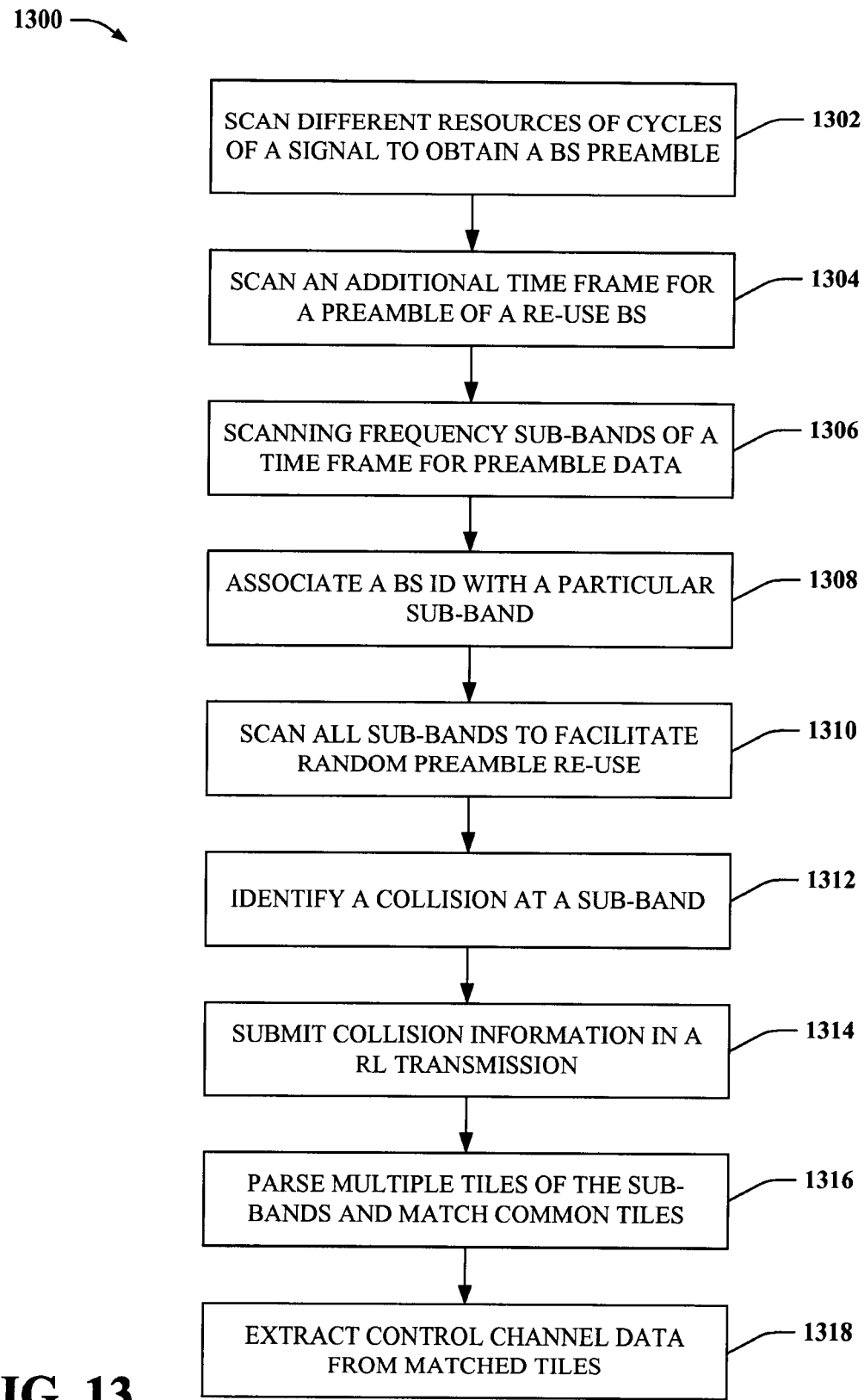
FIG. 13 depicts a flowchart of an example methodology for facilitating BS detection at a wireless receiver according to disclosed aspects.

FIG. 13 depicts a flowchart of an example methodology 1300 for facilitating interference reduction at a wireless receiver according to disclosed aspects. At 1302, method 1300 can scan different resources of two or more cycles of a wireless signal to obtain preamble information of a BS, as described herein. The resources can be determined based at least in part on a type of BS sought. At 1304, method 1300 can scan at least one additional time frame of the wireless signal to obtain a preamble of a re-use BS. At 1306, method 1300 can scan frequency sub-bands of a time frame for preamble data of a particular re-use BS. At 1308, method 1300 can associate a BS ID with a particular sub-band. For instance, where re-use of channel resources is planned to facilitate minimal preamble collision (e.g., where more frequency sub-bands exist than base stations employing such sub-bands). At 1310, method 1300 can scan all frequency sub-bands of the time frame to facilitate identifying a preamble of a serving BS employing random/pseudo-random sub-band re-use. At 1312, method 1300 can identify a collision (e.g. based on interference) at a sub-band. At 1314, collision information can be provided to a serving BS in a RL transmission. At 1316, multiple frequency sub-band tiles can be parsed to match common tiles associated with preamble data of a BS. At 1318, control channel information can be extracted from one or more of the matched frequency sub-band tiles.

Figure 14:
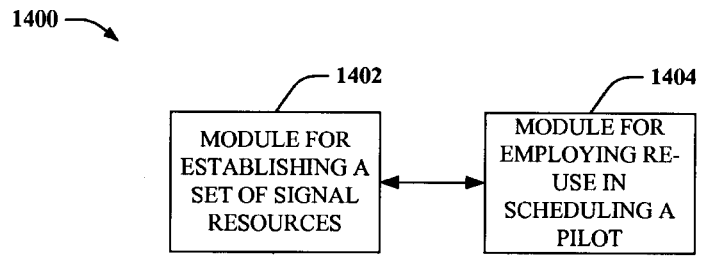
FIG. 14 illustrates a block diagram of an example system that provides BS detection in a wireless AN according to particular aspects of the disclosure.

FIG. 14 depicts a block diagram of an example system 1400 that provides detection of a BS in a wireless AN based on signal management for semi or un-planned heterogeneous BSs. System 1400 can comprise a module 1402 for establishing a set of signal resources for a wireless signal. The resources can be distinguishable in time, frequency and/or code-based divisions of the wireless signal, as known in the art. In addition, system 1400 can comprise a module 1404 for employing re-use for scheduling an acquisition pilot to the wireless signal. In particular, the re-use can be configured such that the pilot is scheduled to a different signal resource in a first cycle of the signal as compared with a second cycle of the signal. In some aspects, the module 1404 can also select signal resources reserved for a particular type of BS (e.g., access type, transmit power, re-use type). According to at least one further aspect, the module 1404 can further blank at least one signal resource allocated to a BS of a disparate type.

Figure 15:
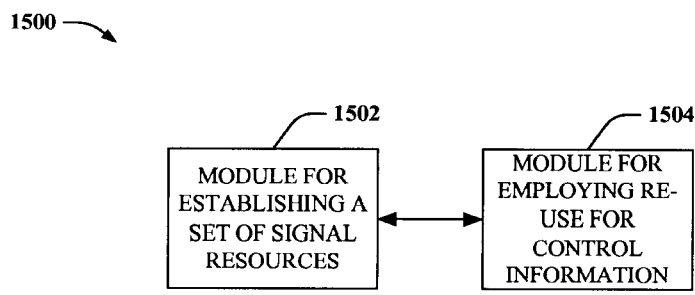
FIG. 15 depicts a block diagram of a sample system that facilitates BS detection in wireless communications according to further disclosed aspects.

FIG. 15 illustrates a block diagram of an example system 1500 that facilitates detection of a BS in a wireless AN. System 1500 can comprise a module 1502 for establishing a set of signal resources for a wireless signal. As described above with respect to FIG. 14, the resources can be distinguishable in time, frequency and/or code-based divisions of the signal, as is known in the art. System 1500 can further comprise a module 1504 for employing random, pseudo-random or learned re-use in scheduling control channel information to the wireless signal. For instance, module 1504 can employ a random or pseudo-random function to select various time frames and/or frequency sub-bands or tiles/tile groups of different cycles of the wireless signal with which to schedule the control channel information. By scheduling the control information in such a manner, it is less likely that persistent control channel collisions will occur at a receiver over the different cycles. Alternatively, or in addition, learned re-use can be employed for scheduling the control channel information. In such case, collision feedback information is utilized by module 1504 to schedule control information in a different resource of the wireless signal than is being used by a colliding BS. Accordingly, system 1500 can significantly mitigate or avoid control channel collisions at receiving devices in a wireless network, facilitating improved BS detection for such devices.

Figure 16:
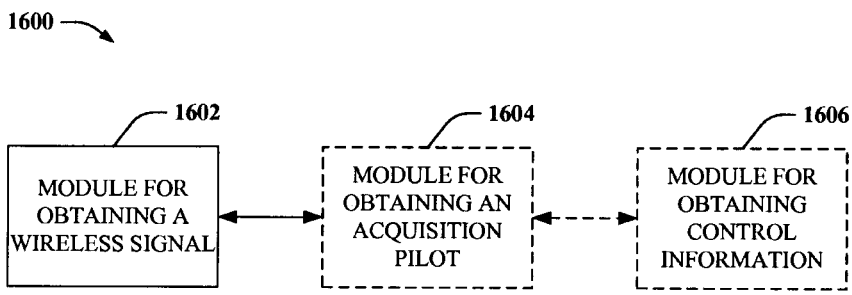
FIG. 16 illustrates a block diagram of a sample system for detecting a BS in a wireless communication environment according to some aspects.

FIG. 16 depicts a block diagram of a sample system 1600 that can detect a BS in a wireless communications environment according to aspects of the subject disclosure. System 1600 can comprise a module 1602 for obtaining a wireless signal comprising a first and second time cycle. System 1600 can, in one alternative aspect, comprise a module 1604 for obtaining an acquisition pilot from one time frame of the first time cycle and from a different time frame of the second time cycle. In another alternative aspect, system 1600 can comprise a module 1606 for employing a random, pseudo-random or learned re-use function in obtaining control channel information from the wireless signal. In either alternative aspect, the module 1604/1606 can ignore time frames allocated to a BS of a disparate type as compared with a transmitting BS in obtaining the pilot/control information. Accordingly, system 1600 can scan signal resources reserved for a particular type of BS, thereby reducing or avoiding interference from a BS of a disparate type, as described herein.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of enabling base station (BS) detection in a wireless access network (AN) to facilitate reduced interference for a semi-planned or unplanned wireless access network , comprising:
    establishing a set of signal resources for a wireless signal transmitted by a BS; and
    employing fractional resource re-use in scheduling a preamble on the set of signal resources of the wireless signal, wherein the fractional resource re-use comprises fractional time re-use of the set of signal resources such that the preamble is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the preamble to occur during only less than all of a first time interval reserved for preamble transmission within a first time cycle of the wireless signal and during only less than all of a second time interval reserved for preamble transmission within a second time cycle of the wireless signal, and wherein a temporal position where the first time interval occurs relative to the first time cycle differs from a temporal position where the second time interval occurs relative to the second time cycle.

2. The method of claim 1, further comprising reserving at least one resource of the wireless signal for at least one of:
  another BS of access type disparate from the BS;
  another BS of transmit power class disparate from the BS; or
  another BS of re-use type different from the BS.

3. The method of claim 1, wherein the fractional resource re-use further comprises frequency or tile re-use of the set of signal resources, wherein a tile is a subset of orthogonal frequency division multiplex (OFDM) subcarriers over a subset of OFDM symbols, time frames, frequency subcarriers or code-based resources of the wireless signal.

4. The method of claim 1, wherein employing fractional resource re-use further comprises planned re-use, random re-use, pseudo-random re-use, time-varying re-use, or learned re-use, or a combination thereof.

5. The method of claim 1, further comprising:
  establishing a set of time-frequency tiles for at least one resource of the wireless signal, each tile of the set comprising one or more frequency sub-carriers over a subset of OFDM symbols, time frames, frequency subcarriers or code-based resources of the wireless signal; and
  employing fractional tile re-use in scheduling control channel information of the wireless signal to a subset of the sub-carriers.

6. The method of claim 1, further comprising scheduling control channel information into grouped time sub-slots of a common interlace of the wireless signal.

7. The method of claim 1, further comprising restricting transmission of the preamble in at least one resource of the wireless signal if the BS is a full re-use BS.

8. A wireless base station (BS) that facilitates BS detection in a wireless access network (AN) to facilitate reduced interference for a semi-planned or unplanned wireless access network, comprising:
  a wireless transceiver that transmits a wireless signal; and
  a signal parser that establishes a set of signal resources for the wireless signal and employs fractional resource re-use in transmitting a preamble via the set of signal resources, wherein the fractional resource re-use comprises fractional time re-use of the set of signal resources such that the preamble is transmitted on different time resources of the wireless signal when the wireless BS is a macro cell BS as compared to when the wireless BS is a femto cell BS or a pico cell BS to reduce interference between a macro cell BS and a femto cell BS or pico cell BS, wherein the fractional time re-use schedules transmission of the preamble to occur during only less than all of a first time interval reserved for preamble transmission within a first time cycle of the wireless signal and during only less than all of a second time interval reserved for preamble transmission within a second time cycle of the wireless signal, and wherein a temporal position where the first time interval occurs relative to the first time cycle differs from a temporal position where the second time interval occurs relative to the second time cycle.

9. The wireless BS of claim 8, the signal parser reserves at least one resource of the wireless signal for at least one of:
  another wireless BS of access type disparate from the wireless BS;
  another wireless BS of transmit power class disparate from the wireless BS; or
  another wireless BS of re-use type different from the wireless BS.

10. The wireless BS of claim 8, the signal parser segments the wireless signal into a set of time resources and a set of frequency resources or a set of OFDM symbol resources.

11. The wireless BS of claim 8, the signal parser employs planned re-use, random re-use, pseudo-random re-use, time-varying re-use, or learned re-use, or a combination thereof, as the resource re-use.

12. The wireless BS of claim 8, further comprising:
  a tiling module that establishes a set of frequency tiles for at least one resource of the wireless signal, each tile of the set comprising one or more frequency sub-carriers over one or more OFDM symbols of the wireless signal; and
  a control schedule module that employs fractional tile re-use in scheduling control channel information of the wireless signal to a subset of the sub-carriers.

13. The wireless BS of claim 8, further comprising a timing partition module that groups time sub-slots of a common interlace of the wireless signal for control information.

14. The wireless BS of claim 8, the signal parser restricts transmission of the preamble in at least one resource of the wireless signal if the wireless BS is a full re-use BS.

15. An apparatus for enabling base station (BS) detection in a wireless access network (AN) to facilitate reduced interference for a semi-planned or unplanned wireless access network, comprising:
  means for establishing a set of signal resources for a wireless signal transmitted by a BS; and
  means for employing fractional resource -re-use in scheduling a preamble on the set of signal resources of the wireless signal, wherein the fractional resource re-use comprises fractional time re-use of the set of signal resources such that the preamble is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the preamble to occur during only less than all of a first time interval reserved for preamble transmission within a first time cycle of the wireless signal and during only less than all of a second time interval reserved for preamble transmission within a second time cycle of the wireless signal, and wherein a temporal position where the first time interval occurs relative to the first time cycle differs from a temporal position where the second time interval occurs relative to the second time cycle.

16. A processor configured to enable base station (BS) detection in a wireless access network (AN) to facilitate reduced interference for a semi-planned or unplanned wireless access network, comprising:
  a first module that establishes a set of signal resources for a wireless signal transmitted by a BS; and
  a second module that employs fractional resource re-use in scheduling a preamble on the set of signal resources of the wireless signal, wherein the fractional resource reuse comprises fractional time re-use of the set of signal resources such that the preamble is scheduled on different time resources of the wireless signal the BS is a macro cell BS as compared to when the BS is a femto cell BS or a pico cell BS to reduce interference between a macro cell BS and a femto cell BS or pico cell BS, wherein the fractional time re-use schedules transmission of the preamble to occur during only less than all of a first time interval reserved for preamble transmission within a first time cycle of the wireless signal and during only less than all of a second time interval reserved for preamble transmission within a second time cycle of the wireless signal, and wherein a temporal position where the first time interval occurs relative to the first time cycle differs from a temporal position where the second time interval occurs relative to the second time cycle.

17. A non-transitory computer-readable medium to facilitate reduced interference for a semi-planned or unplanned wireless access network, comprising
computer-readable instructions executable by at least one computer to:
establish a set of signal resources for a wireless signal transmitted by a base station (BS); and
employ fractional resource re-use in scheduling a preamble on the set of signal resources of the wireless signal, wherein the fractional resource re-use comprises fractional time re-use of the set of signal resources such that the preamble is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the preamble to occur during only less than all of a first time interval reserved for preamble transmission within a first time cycle of the wireless signal and during only less than all of a second time interval reserved for preamble transmission within a second time cycle of the wireless signal, and wherein a temporal position where the first time interval occurs relative to the first time cycle differs from a temporal position where the second time interval occurs relative to the second time cycle.

18. A method of enabling base station (BS) detection in a wireless access network (AN) to facilitate reduced interference for a semi-planned or unplanned wireless access network, comprising:
establishing a set of signal resources for a wireless signal transmitted by a BS; and
employing random, pseudo-random or learned re-use in scheduling control channel information on the wireless signal, wherein the re-use comprises fractional time re-use of the set of signal resources such that the control channel information is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the control channel information to occur during only less than all of a first time interval reserved for transmission of control channel information within a first time cycle of the wireless signal and during only less than all of a second time interval reserved for transmission of control channel information within a second time cycle of the wireless signal, and wherein a temporal position where the first time interval occurs relative to the first time cycle differs from a temporal position where the second time interval occurs relative to the second time cycle.

19. The method of claim 18, further comprising reserving at least one resource of the wireless signal for at least one of:
another BS of access type disparate from the BS;
another BS of transmit power class disparate from the BS; or
another BS of re-use type different from the BS.

20. The method of claim 19, further comprising scheduling the reserved resource(s) substantially adjacent to a signal resource comprising the control channel information.

21. The method of claim 18, wherein the random, pseudo-random or learned re-use further employs fractional frequency re-use for the control channel scheduling, wherein a tile comprises a subset of subcarriers over a subset of OFDM symbols of the wireless signal.

22. The method of claim 18, further comprising sub-dividing at least one resource of the set to facilitate the random, pseudo-random or learned re-use.

23. The method of claim 18, further comprising employing fractional time or frequency re-use in scheduling an acquisition pilot to the wireless signal.

24. The method of claim 18, further comprising:
establishing a set of frequency tiles for at least one resource of the wireless signal, each tile of the set comprising a plurality of sub-carriers; and
employing tile re-use in scheduling the control channel information of the wireless signal to a subset of the sub-carriers.

25. The method of claim 24, further comprising employing a random, pseudo-random or time-varying function to select tiles from the set to form the subset.

26. The method of claim 18, further comprising grouping a plurality of time resources of a common interlace of the wireless signal for the control channel information.

27. The method of claim 26, further comprising:
scheduling reverse link (RL) assignment information in time resources of the set prior to the grouped plurality of time resources; and
scheduling RL acknowledgement (ACK) information in time resources of the set subsequent to the grouped plurality of time resources.

28. A wireless base station (BS) that enables BS detection in a wireless access network (AN) to facilitate reduced interference for a semi-planned or unplanned wireless access network, comprising:
a wireless transceiver that transmits a wireless signal; and
a signal parser that establishes a set of signal resources for the wireless signal and employs random, pseudo-random or learned resource re-use in scheduling control channel information to the wireless signal, wherein the re-use comprises fractional time re-use of the set of signal resources such that the control channel information is scheduled on different time resources of the wireless signal when the wireless BS is a macro cell BS as compared to when the wireless BS is a femto cell BS or a pico cell BS to reduce interference between a macro cell BS and a femto cell BS or pico cell BS, wherein the fractional time re-use schedules transmission of the control channel information to occur during only less than all of a first time interval reserved for transmission of control channel information within a first time cycle of the wireless signal and during only less than all of a second time interval reserved for transmission of control channel information within a second time cycle of the wireless signal, and wherein a temporal position where the first time interval occurs relative to the first time cycle differs from a temporal position where the second time interval occurs relative to the second time cycle.

29. The wireless BS of claim 28, the signal parser reserves at least one resource of the wireless signal for at least one of:
   another wireless BS of access type disparate from the wireless BS;
   another wireless BS of transmit power class disparate from the wireless BS; or
   another wireless BS of re-use type different from the wireless BS.

30. The wireless BS of claim 28, the signal parser schedules the reserved resource(s) substantially adjacent to a signal resource that comprises the control channel information.

31. The wireless BS of claim 28, further comprising a timing partition module that defines the first and second time intervals.

32. The wireless BS of claim 28, the signal parser segments the wireless signal into a set of time and a set of frequency resources and employs time and frequency re-use in scheduling the control channel information.

33. The wireless BS of claim 28, the signal parser schedules the control channel information to:
   a specified sub-band of a subset of the set of signal resources;
   a random or pseudo-random sub-band of the subset; or
   a selected resource of the subset, the selected resource provides reduced control channel collision from a nearby BS determined at last in part from collision feedback.

34. The wireless BS of claim 28, further comprising a synchronization module that employs time or frequency re-use in scheduling a synchronization signal to the wireless signal.

35. The wireless BS of claim 28, further comprising:
   a tiling module that establishes a set of frequency tiles for at least one resource of the wireless signal, each tile of the set comprising a plurality of sub-carriers; and
   a control schedule module that employs tile re-use in scheduling control channel information of the wireless signal to a subset of the sub-carriers.

36. The wireless BS of claim 28, further comprising a timing partition module that groups two resources of the set in a common interlace of the wireless signal for the control channel information.

37. The wireless BS of claim 36, wherein the signal parser:
   schedules RL assignment information in time resources of the set prior to the grouped plurality of time resources; and
   schedules RL ACK information in time resources of the set subsequent to the grouped plurality of time resources.

38. An apparatus for enabling base station (BS) detection in a wireless access network (AN) to facilitate reduced interference for a semi-planned or unplanned wireless access network, comprising:
   means for establishing a set of signal resources for a wireless signal transmitted by a BS; and
   means for employing random, pseudo-random or learned re-use in scheduling control channel information to the wireless signal, wherein the re-use comprises fractional time re-use of the set of signal resources such that the control channel information is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the control channel information to occur during only less than all of a first time interval reserved for transmission of control channel information within a first time cycle of the wireless signal and during only less than all of a second time interval reserved for transmission of control channel information within a second time cycle of the wireless signal, and wherein a temporal position where the first time interval occurs relative to the first time cycle differs from a temporal position where the second time interval occurs relative to the second time cycle.

39. A processor configured to enable base station (BS) detection in a wireless access network (AN) to facilitate reduced interference for a semi-planned or unplanned wireless access network, comprising:
   a first module that establishes a set of signal resources for a wireless signal transmitted by a BS; and
   a second module that employs random, pseudo-random or learned re-use in scheduling control channel information to the wireless signal, wherein the re-use comprises fractional time re-use of the set of signal resources such that the control channel information is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the control channel information to occur during only less than all of a first time interval reserved for transmission of control channel information within a first time cycle of the wireless signal and during only less than all of a second time interval reserved for transmission of control channel information within a second time cycle of the wireless signal, and wherein a temporal position where the first time interval occurs relative to the first time cycle differs from a temporal position where the second time interval occurs relative to the second time cycle.

40. A non-transitory computer-readable medium, comprising:
   computer-readable instructions executable by at least one computer to:
   establish a set of signal resources for a wireless signal transmitted by a base station (BS); and
   employ random, pseudo-random or learned re-use in scheduling control channel information to the wireless signal, wherein the re-use comprises fractional time re-use of the set of signal resources such that the control channel information is scheduled on different time resources of the wireless signal when the BS is a macro cell BS as compared to when the BS is a femto cell BS or a pico cell BS to reduce interference between a macro cell BS and a femto cell BS or pico cell BS, wherein the fractional time re-use schedules transmission of the control channel information to occur during only less than all of a first time interval reserved for transmission of control channel information within a first time cycle of the wireless signal and during only less than all of a second time interval reserved for transmission of control channel information within a second time cycle of the wireless signal, and wherein a temporal position where the first time interval occurs relative to the first time cycle differs from a temporal position where the second time interval occurs relative to the second time cycle.

41. A method of detecting a wireless base station (BS), comprising:
   obtaining a wireless signal transmitted by the wireless BS and comprising at least a first and second time cycle; and at least one of:
obtaining a preamble from the wireless signal according to a re-use function; or
employing a random, pseudo-random or learned re-use function to obtain control channel information from the wireless signal,
wherein the re-use functions comprise fractional time re-use such that the preamble or control channel information is obtained from different time resources of the wireless signal when the wireless BS is a macro cell BS as compared to when the wireless BS is a femto cell BS or a pico cell BS to avoid interference between a macro cell BS and a femto cell BS or pico cell BS, wherein the fractional time re-use schedules transmission of the preamble or control channel information to occur during only less than all of a first time interval reserved for preamble transmission or transmission of control channel information within the first time cycle of the wireless signal and during only less than all of a second time interval reserved for preamble transmission or transmission of control channel information within the second time cycle of the wireless signal, and wherein a temporal position where the first time interval occurs relative to the first time cycle differs from a temporal position where the second time interval occurs relative to the second time cycle.

42. The method of claim 41, wherein a first acquisition pilot in the preamble is a significant interferer of a second acquisition pilot transmitted by a second base station in a same time cycle as the first acquisition pilot.

43. The method of claim 42, further comprising connecting to the second base station.

44. The method of claim 43, wherein connecting to the second base station further comprises at least one of:
implementing initial access to the second base station;
implementing UE-initiated handoff to the second base station; or
facilitating network-initiated handoff to the second base station by reporting an ID of such base station to a serving base station.

45. The method of claim 42, further comprising initiating interference avoidance with the second base station.

46. The method of claim 45; wherein initiating interference avoidance comprises at least one of:
providing a signal characteristic of the second acquisition pilot to the second base station;
sending an interference avoidance message to the second base station at least in part over a backhaul link that couples such base station with a serving base station; sending the interference avoidance message OTA to the second base station; or reporting the second base station to the serving base station.

47. The method of claim 41, further comprising:
detecting signal interference on a frequency sub-band containing the preamble or control channel information; and
sending an RL transmission indicating a collision has occurred on the frequency sub-band.

48. The method of claim 47, further comprising:
identifying an ID of one or more colliding BSs on the frequency sub-band; and
including the identified BS ID(s) with the RL transmission.

49. The method of claim 41, further comprising parsing at least one resource of the wireless signal into multiple frequency sub-carrier tiles.

50. The method of claim 49, employing the random or pseudo-random function further comprises matching two or more of the frequency tiles that convey the control channel information.

51. The method of claim 50, further comprising extracting the control channel information from the matched frequency tiles.

52. An apparatus configured for detection of a wireless base station (BS) to facilitate reduced interference for a semi-planned or unplanned wireless access network, comprising:
a wireless antenna that obtains a wireless signal transmitted by the wireless BS and comprising at least a first and second time cycle;
a receive processor that at least one of:
obtains a preamble from the wireless signal according to a re-use function; or
employs a random, pseudo-random or learned re-use function to obtain control channel information from the wireless signal,
wherein the re-use functions comprise fractional time re-use such that the preamble or control channel information is obtained from different time resources of the wireless signal when the wireless BS is a macro cell BS as compared to when the wireless BS is a femto cell BS or a pico cell BS to avoid interference between a macro cell BS and a femto cell BS or pico cell BS, wherein the fractional time re-use schedules transmission of the preamble or control channel information to occur during only less than all of a first time interval reserved for preamble transmission or transmission of control channel information within the first time cycle of the wireless signal and during only less than all of a second time interval reserved for preamble transmission or transmission of control channel information within the second time cycle of the wireless signal, and wherein a temporal position where the first time interval occurs relative to the first time cycle differs from a temporal position where the second time interval occurs relative to the second time cycle; and
memory coupled to the receive processor.

53. The apparatus of claim 52, further comprising:
an ID module that extracts ID information of the wireless BS from a frequency sub-band of the wireless signal; and
a BS re-use module that associates the wireless BS with the frequency sub-band, wherein the receive processor obtains the preamble from the frequency sub-band.

54. The apparatus of claim 52, further comprising:
an interference module that detects signal interference on a frequency sub-band of the wireless signal containing the preamble or control channel information; and
a collision reporting module that initiates an RL transmission indicating a collision has occurred on the frequency sub-band.

55. The apparatus of claim 54, further comprising an ID module that identifies an ID of one or more colliding BSs on the frequency sub-band and provides the ID(s) to the collision reporting module to include with the RL transmission.

56. The apparatus of claim 54, further comprising a tiling module that parses at least one resource of the wireless signal into multiple frequency sub-carrier tiles.

57. The apparatus of claim 56, the tiling module matches two or more of the frequency tiles that convey the control channel information.

58. The apparatus of claim 57, the receive processor extracts the control channel information from the matched frequency tiles.

59. The apparatus of claim 52, wherein an acquisition pilot in the preamble is a significant interferer of a second acquisition pilot transmitted by a second base station in a same time cycle as the first acquisition pilot.

60. The apparatus of claim 59, wherein the receive processor connects to the second base station.

61. The apparatus of claim 60, wherein the receive processor connects to the second base station by at least one of:
- implementing initial access to the second base station;
- implementing UE-initiated handoff to the second base station; or
- facilitating network-initiated handoff to the second base station by reporting an ID of such base station to a serving base station.

62. The apparatus of claim 59, wherein the receive processor initiates interference avoidance with the second base station.

63. The apparatus of claim 62, wherein the receive processor initiates interference avoidance by employing the antenna to at least one of:
- provide a signal characteristic of the second acquisition pilot to the second base station;
- send an interference avoidance message to the second base station at least in part over a backhaul network coupling such base station with a serving base station;
- send the interference avoidance message OTA to the second base station; or
- send a message to the serving base station reporting the second base station.

64. An apparatus for detecting a wireless base station (BS), comprising:
- means for obtaining a wireless signal transmitted by the wireless BS and comprising at least a first and second time cycle; and at least one of:
- means for obtaining a preamble from the wireless signal according to a re-use function; or
- means for employing a random, pseudo-random or learned re-use function to obtain control channel information from the wireless signal,
- wherein the re-use functions comprise fractional time re-use such that the preamble or control channel information is obtained from different time resources of the wireless signal when the wireless BS is a macro cell BS as compared to when the wireless BS is a femto cell BS or a pico cell BS to avoid interference between a macro cell BS and a femto cell BS or pico cell BS, wherein the fractional time re-use schedules transmission of the preamble or control channel information to occur during only less than all of a first time interval reserved for preamble transmission or transmission of control channel information within the first time cycle of the wireless signal and during only less than all of a second time interval reserved for preamble transmission or transmission of control channel information within the second time cycle of the wireless signal, and wherein a temporal position where the first time interval occurs relative to the first time cycle differs from a temporal position where the second time interval occurs relative to the second time cycle.

65. A processor configured to detect a wireless base station (BS), comprising:
- a first module that obtains a wireless signal transmitted by the wireless BS and comprising at least a first and second time cycle; and
- a second module that at least one of:
- obtains a preamble from the wireless signal according to a re-use function; or
- employs a random, pseudo-random or learned re-use function to obtain control channel information from the wireless signal,
- wherein the re-use functions comprise fractional time re-use such that the preamble or control channel information is obtained from different time resources of the wireless signal when the wireless BS is a macro cell BS as compared to when the wireless BS is a femto cell BS or a pico cell BS to avoid interference between a macro cell BS and a femto cell BS or pico cell BS, wherein the fractional time re-use schedules transmission of the preamble or control channel information to occur during only less than all of a first time interval reserved for preamble transmission or transmission of control channel information within the first time cycle of the wireless signal and during only less than all of a second time interval reserved for preamble transmission or transmission of control channel information within the second time cycle of the wireless signal, and wherein a temporal position where the first time interval occurs relative to the first time cycle differs from a temporal position where the second time interval occurs relative to the second time cycle.

66. A non-transitory computer-readable medium, comprising:
- computer-readable instructions executable by at least one computer to:
- obtain a wireless signal transmitted by a base station (BS) and comprising at least a first and second time cycle; and at least one of:
- obtain a preamble from the wireless signal according to a re-use function; or
- employ a random, pseudo-random or learned re-use function to obtain control channel information from the wireless signal,
- wherein the re-use functions comprise fractional time re-use such that the preamble or control channel information is obtained from different time resources of the wireless signal when the BS is a macro cell BS as compared to when the BS is a femto cell BS or a pico cell BS to avoid interference between a macro cell BS and a femto cell BS or pico cell BS, wherein the fractional time re-use schedules transmission of the preamble or control channel information to occur during only less than all of a first time interval reserved for preamble transmission or transmission of control channel information within the first time cycle of the wireless signal and during only less than all of a second time interval reserved for preamble transmission or transmission of control channel information within the second time cycle of the wireless signal, and wherein a temporal position where the first time interval occurs relative to the first time cycle differs from a temporal position where the second time interval occurs relative to the second time cycle.

* * * * *